(12) United States Patent
Wang

(10) Patent No.: US 10,255,602 B2
(45) Date of Patent: Apr. 9, 2019

(54) LOCATION-BASED VERIFICATION FOR PREDICTING USER TRUSTWORTHINESS

(71) Applicant: Kevin Sunlin Wang, Flushing, NY (US)

(72) Inventor: Kevin Sunlin Wang, Flushing, NY (US)

(73) Assignee: OPERR TECHNOLOGIES, INC., Flushing, NY (US)

( * ) Notice: Subject to any disclaimer, the term of this patent is extended or adjusted under 35 U.S.C. 154(b) by 0 days.

(21) Appl. No.: 16/120,172

(22) Filed: Aug. 31, 2018

(65) Prior Publication Data

US 2019/0073676 A1    Mar. 7, 2019

Related U.S. Application Data

(60) Provisional application No. 62/583,300, filed on Nov. 8, 2017, provisional application No. 62/553,581, filed on Sep. 1, 2017.

(51) Int. Cl.
| | |
|---|---|
| *G06Q 20/40* | (2012.01) |
| *G06Q 20/38* | (2012.01) |
| *G06Q 50/00* | (2012.01) |
| *G06Q 20/32* | (2012.01) |
| *H04W 4/029* | (2018.01) |
| *G06Q 40/02* | (2012.01) |

(52) U.S. Cl.
CPC ..... *G06Q 20/4016* (2013.01); *G06Q 20/3224* (2013.01); *G06Q 20/3829* (2013.01); *G06Q 20/405* (2013.01); *G06Q 40/025* (2013.01); *G06Q 50/01* (2013.01); *H04W 4/029* (2018.02)

(58) Field of Classification Search
None
See application file for complete search history.

(56) References Cited

U.S. PATENT DOCUMENTS

| | | |
|---|---|---|
| 7,089,208 B1 | 8/2006 | Levchin |
| 8,781,984 B2 | 7/2014 | Schreiner |
| 9,070,088 B1 | 6/2015 | Baveja |
| 9,288,217 B2 | 3/2016 | Kirkham |
| 9,424,612 B1 | 8/2016 | Bright |
| 9,536,065 B2 | 1/2017 | Bouse et al. |
| 9,589,023 B2 | 3/2017 | Lunt |
| 9,654,288 B1 | 5/2017 | Howell |

(Continued)

OTHER PUBLICATIONS

Shane, Thomas, Search Report & Written Opinion of the ISA for PCT/US18/49278, dated Nov. 5, 2018, 10 pages.

*Primary Examiner* — Joseph W. King
(74) *Attorney, Agent, or Firm* — Monte, Wang & Associates, PLLC

(57) ABSTRACT

A system and computer-implemented method are provided for predicting user trustworthiness through location-based verification with social networking, and for providing an on-line platform for communicating trustworthiness information between different users. The system collects user time and location data to verify the trustworthiness of user transactions. Trustworthiness ratings are established in part by tracking, for particular transactions, time-varying geographic locations of one or more remote computing devices of one or more users associated with the particular transactions, and comparing the time-location data for the particular transactions with one or more time-based attributes or location-based attributes of the transactions.

20 Claims, 9 Drawing Sheets

(56) References Cited

U.S. PATENT DOCUMENTS

| | | |
|---|---|---|
| 9,674,205 B2 | 6/2017 | Kirkham |
| 9,715,003 B2 | 7/2017 | Tseng et al. |
| 10,003,922 B2 | 6/2018 | Kalis |
| 2013/0073473 A1 | 3/2013 | Heath |
| 2015/0304437 A1 | 10/2015 | Vaccari et al. |
| 2017/0061422 A1 | 3/2017 | Castinado et al. |

FIG. 9
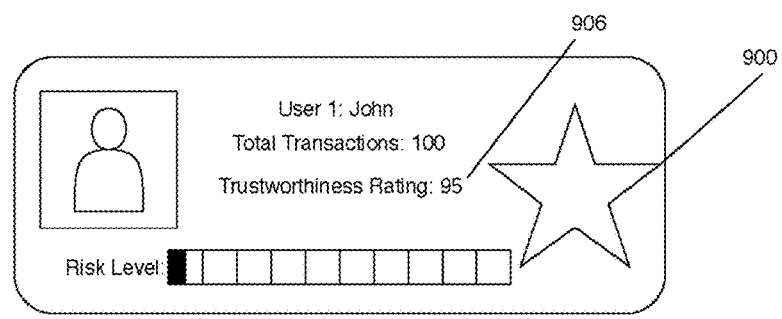
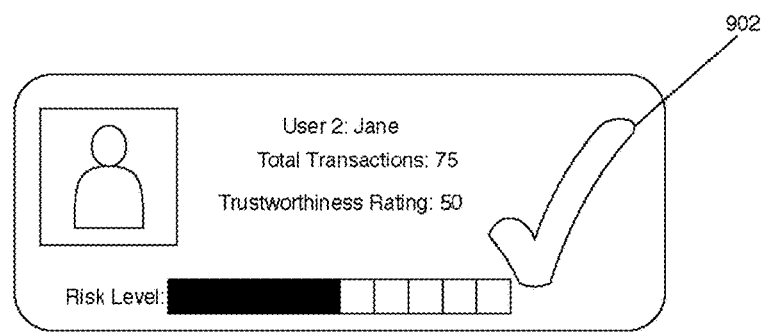
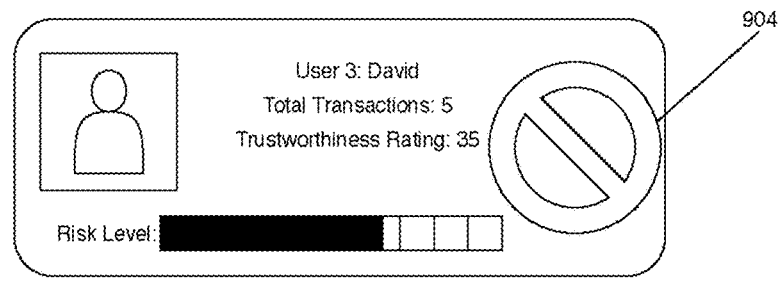

LOCATION-BASED VERIFICATION FOR PREDICTING USER TRUSTWORTHINESS

CROSS-REFERENCE TO RELATED APPLICATIONS

This application claims the benefit of U.S. Provisional Patent Application No. 62/583,300, filed Nov. 8, 2017, as well as U.S. Provisional Patent Application No. 62/553,581, filed Sep. 1, 2017, the disclosures of which are hereby incorporated by reference herein in their entireties.

FIELD OF THE INVENTION

The present application relates to predicting user trustworthiness through location-based verification with social networking, and more particularly, to an on-line platform for communicating trustworthiness indicators between different users.

BACKGROUND OF THE INVENTION

Access to financial resources is an integral aspect of successfully living in a modern society. However, many people have a minimal amount of expendable cash in their savings accounts, and thus do not have enough cash to cover sudden, costly emergencies such as car repairs or an unexpected hospital visit. In such circumstances, individual loans are often preferred over bank loans as they tend to be more practical, flexible, faster, and more easily attainable. However, one critical issue with social lending or individual (i.e., peer-to-peer) loans is establishing a borrower's trust and/or creditworthiness. The larger the loan, the higher the burden or potential awkwardness in obtaining the funds from friends, family, and/or conventional financial institutions. Similarly, the higher the value of the loaned goods or the more expensive the service, the higher the threshold for establishing or verifying a lender's or borrower's trustworthiness as authentic and reliable.

It may be difficult for people who have a positive history of borrowing, lending, servicing, returning, and/or repaying loans from friends or acquaintances to prove their trustworthiness to a stranger or on-line contact because there may not be any records and/or means for verifying prior and/or current transaction activities. Additionally, a potential borrower who has established a reliable cash flow through lending out various assets, spaces, etc., but has done so on his/her own without the help of financial institutions, may have a difficult time proving this to a potential lender who does not know the potential borrower. This is because on-line financial lending platforms use similar means of verifying lenders and borrowers as traditional lending institutions such as banks, and thus often have the same requirements, including credit history, background checks, etc.

The sharing economy (also referred to as collaborative consumption, collaborative economy, peer economy, etc.), broadly speaking, refers to economic activity involving on-line transactions, including peer-to-peer based sharing of access to money, goods and/or services. The sharing economy may take a variety of forms, including using information technology to provide individuals with information that enables the optimization of resources through the mutualization of excess capacity in money, goods and services. Examples of the sharing economy include peer-to-peer lending or sharing, crowdfunding, apartment/house renting or couch-surfing, office sharing, ridesharing and carsharing, co-working, reselling and trading, knowledge and talent-sharing, niche services (e.g., bike renting, pet boarding, etc.), etc. In particular, for example, peer-to-peer lending platforms (e.g., Lending Club, Prosper, etc.) allow individuals to lend and borrow money without going through a traditional bank. However, such platforms typically still use the borrower's credit history to establish and set interest rates, but the individual lender of the money or good bears the risk (i.e., an unsecured personal loan, etc.). Because traditional institution-to-individual lending is not an option for many would-be borrowers, peer-to-peer lending offers opportunities for a wider range of borrowers. Though peer-to-peer lending creates risks for individual lenders, it also allows them to put some of their capital to use (e.g., without researching stocks and funds or settling for meager interest payments from a savings account). Some advantages of the sharing economy include cheaper goods and services, extra income for providers, new and better opportunities, stronger communities, more flexibility in work and life, more ways to earn and save money, less worry about valuable possessions and obligations, more adaptable businesses, etc. Of course, there are also certain disadvantages of the sharing economy, including privacy/safety/trust concerns, no or few guarantees, cooperation with others, market distortions, etc.

Another common issue arising with on-line financial and sharing transactions is identity verification for lenders and borrowers who wish to engage in transactions through the internet. Identity verification can be difficult because some internet users create false identities, commit identity fraud, and/or collude with one another to create the appearance of legitimacy to induce unsuspecting customers (i) to lend financial or other subjects of value which are never repaid or returned, (ii) to pay for services which are never performed, and/or (iii) to borrow/purchase goods which never arrive. Such dishonest individuals may use publicly available information about other people, including name, date of birth, marital status, etc., as well as pictures of such people, in their accounts to support the deceptions. These individuals may also create fake identities with false names, date of birth, address, etc., and create multiple on-line accounts using the false identities. Such accounts may include blog accounts, email addresses, social networking system accounts, etc. These accounts allow dishonest users to fraudulently open additional fake accounts with other websites and businesses, and scam people out of their money and/or possessions. Additionally, such dishonest users may be criminals who rob or harm potential borrowers in person. For example, dishonest users of certain websites have posted ads in order to lure victims to a location where they are robbed or harmed. Thus, the prior art has a technological problem with online security for business sharing transactions, particularly with respect to transactions which start online but then involve offline activity such as travel and a meetup between a lender and a borrower. Current technology cannot properly predict user trustworthiness in a manner which fosters trust between users because it is unable to sufficiently identify and preclude on-line fraudulent activity. Lenders and borrowers who do not know one another do not have an easy means of ascertaining the financial trustworthiness or even the general safety of a contemplated transaction which involves an in-person meeting (e.g., borrowing goods, providing services or skills, renting a space, etc).

The ability to quickly verify the trustworthiness and legitimacy of a potential lender or borrower, or sharer/sheree in a sharing economy, as well as the safety of a contemplated transaction, would therefore encourage selling or sharing monetary or non-monetary subjects of value between potential participants. It will therefore be appreciated that improved systems and methods are needed in the art to address these issues, and to utilize technological improvements for determining and verifying an individual's trustworthiness in sharing, lending, borrowing, purchasing, or other transactions.

SUMMARY OF THE INVENTION

This summary is not intended to identify or point to essential features or limit the scope of the subject matter claimed herein. The inventive disclosure involves verifying transactions for shared subjects of value using location-based services or global positioning system (GPS) technology to authenticate performance of commercial or other transactions between lending and borrowing users in order to establish trustworthiness ratings for users, estimate cash flow, predict future cash flow or valuation based on repeat or new customers and prior history, and deploy customizable indicators representative of various risk factors and trustworthiness associated with the system users. In particular, the systems and methods of the inventive disclosure provide a platform by which users can make decisions about whether to engage other users in business sharing transactions based on the indicators generated for the users.

Generally, the methods and systems of the inventive disclosure have at least the following objectives:

To utilize location-based services (LBS) or global positioning system (GPS) technology to authenticate performance of commercial or other transactions between users in order to verify the transactions underlying a lending user's established cash flow;

To enhance the safety of borrowers and lenders contemplating transactions involving non-monetary subjects of value which require in-person meetings;

To provide an on-line platform for building credit and trustworthiness between lenders and borrowers to facilitate buying or sharing various services, skills, goods, spaces, transportation vehicles or services, or other subjects of value;

To provide an on-line platform for verifying and updating a user's credit and trustworthiness on a regular basis or each time the user performs a transaction;

To provide an on-line platform which determines an estimated cash flow of lending users based on an average value of the subjects of the transactions with which the user is associated and a frequency of the user's transactions;

To predict a future cash flow of a user based on prior verified transactions, and to transmit an indicator to one or more other users indicative of the predicted cash flow;

To provide an on-line platform that identifies the legitimacy of the identity of a user by comparing the information provided by the user to information available in third-party on-line systems (e.g., social networking systems, email servers, blogs, etc.) and/or information included in government issued identifications;

To establish and update a trustworthiness score/rating/ranking for a user based on a trustworthiness factor determined for a particular transaction by comparing a time-based attribute or a location-based attribute of the particular transaction with location data or time data of the user's remote computing device during a particular transaction, along with at least one of an agreed upon value of a subject of the particular transaction or a verification of full payment for the particular transaction;

To encourage and facilitate selling, buying, borrowing, lending, or sharing one or more subjects of value between two or more users based on verified prior transactions, social network connections, and ratings;

To provide a user engagement panel configured for a plurality of users to exchange information regarding various aspects of transactions, including buying, borrowing, lending, sharing, feedback, and ratings;

To provide a module or platform for collecting insurance or surety fees to guarantee repayment of loans or compensation to potential lending users of loaned subjects of value;

To identify various types of connections between users and share information and notifications between users with common interests;

To notify a first user when a second user's updated trustworthiness rating exceeds a predetermined threshold or when the second user completes a predetermined number of sharing transactions; and To display a first user's trustworthiness rating with one or more indicators in one or more formats corresponding to a second user's preferences.

In accordance with one embodiment, a computer-implemented method is provided which comprises receiving, from a plurality of location identifiers of a plurality of remote computing devices associated with a plurality of users, location data and time data corresponding to a plurality of time-varying geographic locations of the users during a plurality of transactions between the users, wherein each of the transactions includes a subject having an agreed upon value and at least one of a time-based attribute or a location-based attribute; storing the location data, the time data, and the at least one time-based attribute or location-based attribute in a database; determining a trustworthiness factor for a particular user of the plurality of users associated with a particular transaction of the plurality of transactions, wherein the particular user has an initial trustworthiness rating, and wherein the trustworthiness factor is based on: (i) comparing, in accordance with a set of predetermined rules, at least one of: (a) the location data with the location-based attribute to determine a level of location compliance, or (b) the time data with the time-based attribute to determine a level of time compliance, wherein the location-based attribute includes at least one of a pick-up location, a drop-off location, an exchange location, or a service location, and wherein the time-based attribute includes at least one of a start time, a start date, an end time, an end date, or a time period; and (ii) at least one of the agreed upon value of the subject of the particular transaction or a verification of full payment for the particular transaction; calculating, for the particular user, an updated trustworthiness rating based on the initial trustworthiness rating and the trustworthiness factor; receiving, from an additional user, one or more preset values or ranges for a desired trustworthiness rating of a potential borrowing user; and displaying, to the additional user, one or more indicators associated with a risk level of the particular user.

In accordance with another embodiment, a method for computing a transaction-based rating for a user comprises establishing an initial rating for a first user; receiving, from a plurality of location identifiers of a plurality of remote computing devices associated with a plurality of additional users, location data and time data corresponding to a plurality of time-varying geographic locations of the additional users during a plurality of transactions between the additional users, wherein each of the transactions includes a subject having an agreed upon value and at least one of a time-based attribute or a location-based attribute, wherein the subject is associated with the first user; storing the location data, the time data, and the at least one time-based attribute or location-based attribute in a database; deriving a location-based compliance metric for each of the plurality of transactions by analyzing the respective location data of the plurality of additional users; deriving a time-based compliance metric for each of the plurality of transactions by analyzing the respective time data of the plurality of additional users; providing the location-based compliance metric and the time-based compliance metric as input to a trustworthiness module and obtaining as output from the module a trustworthiness factor for the first user, wherein the trustworthiness module is rule based; computing, for the first user, an updated trustworthiness rating based on the initial trustworthiness rating and the trustworthiness factor; and displaying an indicator corresponding to the updated trustworthiness rating of the first user on at least one of the plurality of remote computing devices associated with the plurality of additional users.

In accordance with yet another embodiment, a computer-implemented system for verifying transaction trustworthiness comprises a server communicatively coupled to one or more computing devices via a network, wherein the one or more computing devices includes one or more location identifiers configured to generate location data corresponding to one or more locations, and wherein the server includes at least one non-transitory computer-readable storage medium with computer-readable instructions stored therein, a database, and a processor configured to provide an on-line platform for enabling a plurality of transactions between two or more users in communication with the computing system over a network through a plurality of remote computing devices, wherein the processor executes the computer-readable instructions to: automatically and periodically receive a time-varying geographic location of at least one of the plurality of remote computing devices, and time data corresponding to the location data; store, in the one or more databases, the location data and the time data corresponding to the at least one remote computing device; determine, for a particular transaction, a trustworthiness factor for at least one of the users associated with the particular transaction based on a comparison of the location data or the time data for the particular transaction with one or more time-based attributes or location-based attributes of the particular transaction; and determine, for the at least one of the users associated with the particular transaction, a trustworthiness rating based on the trustworthiness factor for the particular transaction and at least one additional trustworthiness factor, the at least one additional trustworthiness factor based on at least one of prior transaction data associated with one or more completed prior transactions, one or more ratings from additional users, a credit worthiness score, an income, or information from a social networking account.

Other objects, features, and characteristics of the inventive disclosure, as well as the methods of operation and functions of the related structural elements and the combination of parts and economies of development and manufacture, will become more apparent upon consideration of the detailed description below with reference to the accompanying drawings, all of which form a part of this specification.

BRIEF DESCRIPTION OF THE DRAWINGS

A further understanding of the inventive disclosure can be obtained by reference to preferred embodiments set forth in the accompanying drawings. The drawings are not intended to limit the scope of this invention, which is set forth with particularity in the claims as appended or as subsequently amended, but merely to clarify and exemplify the invention. Accordingly, a more complete appreciation of the inventive disclosure and many of the attendant aspects thereof may be readily obtained as the same becomes better understood by reference to the following detailed description when considered in conjunction with the accompanying drawings, where:

FIG. 9 is a diagram showing exemplary indicators representative of risk factors and trustworthiness of a user.

DETAILED DESCRIPTION OF THE INVENTION

Figure 1:
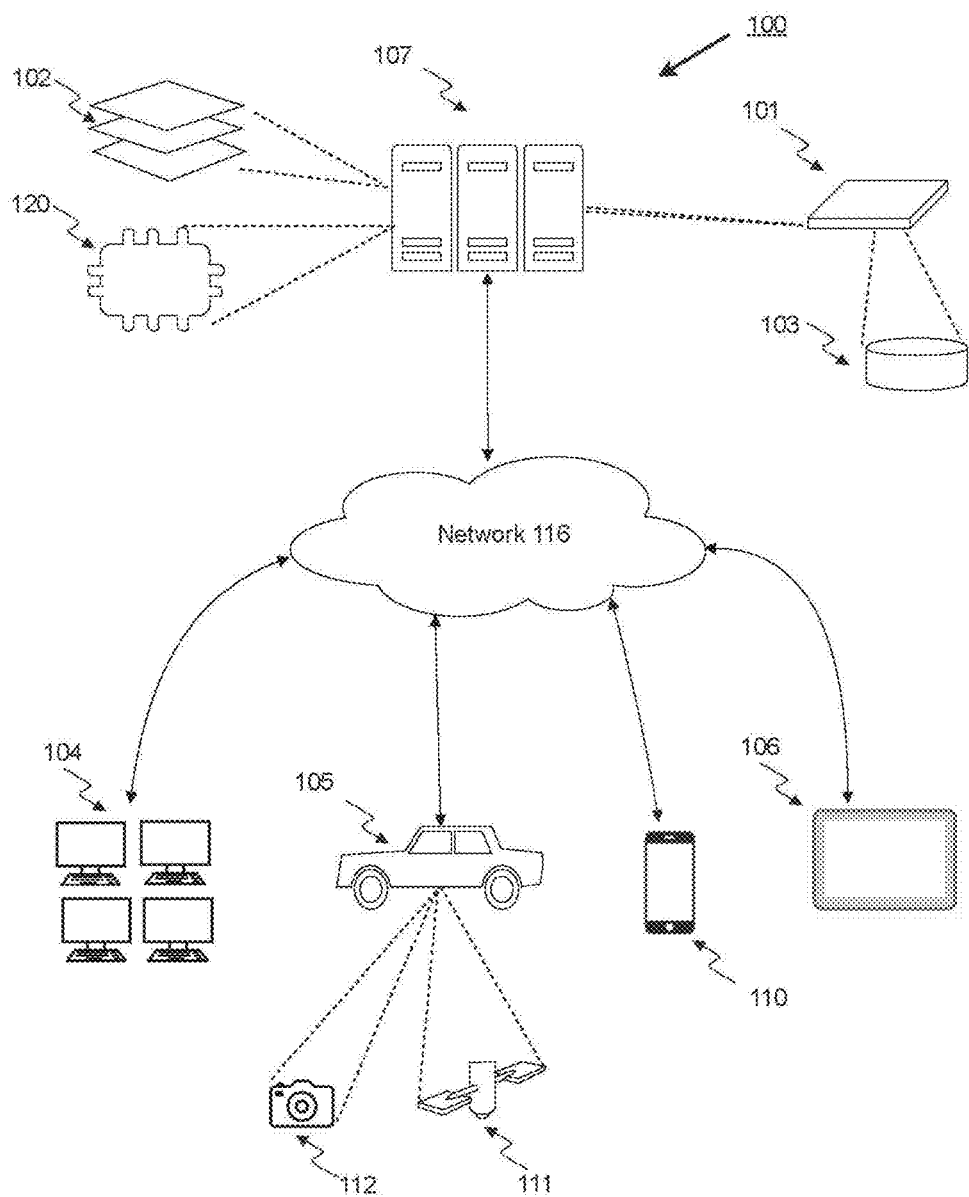
FIG. 1 is a diagram of an on-line sharing and transaction verification system in accordance with exemplary embodiments of the inventive disclosure.

As required, detailed illustrative embodiments of the inventive disclosure are disclosed herein. However, techniques, methods, systems, and operating structures in accordance with the inventive disclosure may be embodied in a wide variety of sizes, shapes, forms and modes, some of which may be quite different from those in the disclosed embodiments. Consequently, the specific structural, functional and step-by-step details disclosed herein are merely representative, yet in that regard, are deemed to include the best mode or embodiment for purposes of disclosure, and to provide a basis for the claims herein which define the scope of the inventive disclosure. The present disclosure is not intended to be limited to the specific terminology so selected, and it is to be understood that each specific element includes all technical equivalents which operate in a similar manner.

In the following detailed description, specific embodiments that may be practiced are shown by way of illustration and explanation. The embodiments are described in sufficient detail to enable those skilled in the art to practice the embodiments, and it is to be understood that logical, mechanical, and other changes may be made without departing from the scope of the embodiments of the invention. The following detailed description is therefore not to be taken in a limiting sense. In describing exemplary embodiments of the inventive disclosure illustrated in the drawings, specific terminology is employed for clarity.

In the description of the figures below, it will be understood that the details described may be combined with or used in place of similar attributes described below, and that the figures are used only to illustrate a particular exemplary embodiment the inventive disclosure. It will be understood that for the purpose of providing simplified figures that are easy to understand, various details discussed herein may have been omitted from the figures. However, it is contemplated that the details described herein may be incorporated or embodied in any feasible manner. For example, elements and/or features of different exemplary embodiments may be combined with one another and/or substituted for one another within the scope of this disclosure. It will also be appreciated that elements of the figures disclosed in this application support combinations of elements for performing specified functions, combinations of steps for performing the specified functions, program instruction media for performing the specified functions, etc., regardless of whether the steps are performed manually, automatically, in sequence, or in another order.

Exemplary embodiments of the inventive disclosure, as described herein, are not limited to applications involving conventional computer programs or programmable apparatuses that run them. It is contemplated, for example, that embodiments of the invention could include an optical computer, quantum computer, analog computer, or the like. Each element in the flowchart illustrations described herein may depict a step or group of steps of a computer-implemented method, and each step may contain one or more sub-steps. For purposes of illustration only, these steps (as well as any and all other steps identified and described) are presented in a certain logical order. However, it will be understood that an exemplary embodiment of the inventive disclosure can contain an alternate order of the steps adapted to a particular application of a technique disclosed herein, and that any variations and modifications are intended to fall within the scope of this disclosure. The depiction and description of steps in any particular order is not intended to exclude embodiments having the steps in a different order, unless required by a particular application, explicitly stated, or otherwise clear from the context.

The elements depicted in the diagrams throughout the figures imply logical boundaries between the elements. However, according to software or hardware engineering practices, the elements depicted and the functions thereof may be implemented as parts of a monolithic software structure, as standalone software modules, or as modules that employ external routines, code(s), services, and so forth, or any combination of these. All such implementations are within the scope of the present disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof. Any of the steps, operations, or processes described herein may be performed or implemented with one or more hardware or software modules, alone or in combination with other devices.

It will be appreciated that computer program instructions utilized with respect to carrying out methodologies disclosed herein may include various types of computer executable code. A variety of languages for expressing computer program instructions are possible, including, but not limited to, C, C++, Java, JavaScript, Python, assembly language, Lisp, etc. Such languages may include assembly languages, hardware description languages, database programming languages, functional programming languages, imperative programming languages, etc. In certain embodiments, computer program instructions can be stored, compiled, or interpreted to run on a computer, a programmable data processing apparatus, a heterogeneous combination of processors or processor architectures, etc.

The invention may be described in the general context of computer-executable instructions, such as program modules, being executed by a computer. Generally, program modules include routines, programs, objects, components, data structures, etc., that perform particular tasks or implement particular data types. The computer program and data may be fixed in any form (e.g., source code form, computer executable form, an intermediate form, etc.) either permanently or transitorily in a tangible storage medium, such as a semiconductor memory device (e.g., RAM, ROM, PROM, EEPROM, Flash-Programmable RAM, etc.), a magnetic memory device (e.g., diskette, fixed hard disk, etc.), an optical memory device (e.g., CD-ROM, DVD, etc.), a PC card (e.g., PCMCIA card, etc.), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software, magnetic tape, etc.), preloaded with a computer system (e.g., on system ROM, fixed disk, etc.), or distributed from a server or electronic bulletin board over the communication system. It is to be appreciated that any of the software components of the inventive disclosure may, if desired, be implemented in ROM (read-only memory) form. The software components may, generally, be implemented in hardware.

Exemplary embodiments of the inventive disclosure include the implementation of systems and methods through a combination of hardware and software that operate on a portable computing device, which further comprises various pre-programmed features combined and integrated with components including but not limited to one or more servers, databases, mobile end applications, web portals, network settings, etc. With the support of these components, information may be provided through user interfaces, such as a website, an application, and/or an in-vehicle navigation system. In addition, one or more servers may be operatively disposed in a distributed structure with support from data centers that may be located anywhere around the world. These implementations may be communicatively linked and cross-platformed with an electronic map display. Any indicators discussed herein may be utilized to convey travel related information, user profile information, system setting information, etc., such that users viewing display apparatuses of remote computing devices can be provided with travel and/or user related data relevant to a specific location or particular transaction.

The systems and methods described herein are for loaning, buying, borrowing, or sharing subjects of value, and may be configured with and/or interfaced via a website and/or a mobile application. Subjects of value described herein may be categorized and subcategorized in accordance with various classifications. By way of example, the categories in a goods sharing categorization may include book sharing, sports gear sharing, furniture sharing (e.g., tables, chairs, couches, desks, lamps, etc.), electronics sharing, equipment/tool sharing, or any other good(s) which may be reused by one or more users. In yet other embodiments, the subjects of value may be categorized into space categories. A space sharing category may include, for example, office space sharing, private parking spot sharing, storage space sharing, public parking spot sharing, office sharing, hotel room sharing, etc. In yet other embodiments, a residence sharing category may include information relating to residential space sharing (e.g., house or room sharing, sharing of pool or patio facilities, etc.). A food category may include information relating to restaurants, preparation items (e.g., pots pans, refrigerators, etc). The systems described herein can also provide information relating to libraries, museums, shows, movies, sporting events, parks, movie theaters, etc., for general use and/or for commercial transactions if applicable.

Interactive maps allowing users to see locations worldwide based on the availability of specific resources such as goods, service skills, transportation, etc., may also be provided. The interactive map can be scalable depending on the needs and preferences of users engaging in various transactions, and can include micropolitan, metropolitan, inter-city or inter-country map viewers with different thematic data sets and visualization tools relating to historical data to portray historical changes and redistribution of resources. For example, some users may only wish to engage in transactions in specific geographic areas, such as on a singular street, in a neighborhood, in a town or village, in a borough, in a city, etc., while other users such as corporations or government entities might be interested in engaging in transactions across larger geographic regions, such as within states or countries.

Exemplary embodiments of the inventive disclosure may also be used by users of different user types, where "users" can refer to or be members of the general public and/or individuals, civilians, companies, drivers, students, teachers, parents, professional company employees, and/or independent contractors. Users may interface with the systems disclosed herein via various computer systems, vehicles, websites, robots, in-vehicle systems, GPS, and/or other systems. It is also intended that the inventive disclosure may be used not only within an application of a computing device, which may include smartphones, tablet computers, laptop computers, in-dash vehicle systems, etc., but also within other systems or services which may process, utilize, and display various data associated therewith, such as, for example, systems including or operatively associated with on-line mapping companies, GPS manufacturers, smart phone or mobile device manufacturers, wireless service providers, application creators and developers, mobile operating system developers and distributors, and automated vehicle systems such as self-driving vehicles, etc.

The social economy discussed herein examines activity related to economics within a community and exposes information to the community through different means. Social Networking is the need to create and maintain more social connections. That need has grown as mobile communication devices such as smartphones and tablets have become an essential tool in a person's work, financial and social life. Smartphone applications ("app(s)") installed on mobile communication devices and various components installed therein, including a clock/time mechanism, global positioning system, etc., can be utilized by a user to create and maintain social connections. These devices may be utilized in conjunction with the systems and methods described herein to verify various sharing transactions and specific subjects of value a user shares or loans. In certain embodiments where professional skills are offered, additional verification may be needed, such as proof of licensure.

Social networking sites do not typically verify user participation and convert it into monetary value or credit, (e.g., allowing users potential access to financing such as loans or loan guarantees). Sharing in a traditional sense involves a transaction between two people where goods, skills, services, spaces, or transportation goods and services are exchanged. Exemplary embodiments of the inventive disclosure can bridge various aspects of a social economy and social networking with business relationship building and transaction verification through location-based technologies that help establish a user's trustworthiness by authenticating present and prior transactions and interactions, thereby encouraging users to share resources.

Social networking websites mostly involve informal connections with family, friends, co-workers, etc. People tend to be more reluctant to connect with strangers for numerous reasons, including security concerns. Similarly, people most often borrow or lend items of value such as goods, services, or money from family, friends, and even co-workers, but are reluctant to engage in transactions with a stranger, particularly where such transactions involve offline activities, travel, and/or specific transaction locations. It will be appreciated that security and trustworthiness are critical and understandable aspects of an individual's reluctance to engage in transactions involving the sharing of goods or services of value with other individuals on-line. Examples of incidents involving popular sites such as Craigslist® are numerous, where people have been injured or killed after arriving at a particular geographic location to conduct a business or personal transaction. Exemplary embodiments of the inventive disclosure offer a platform for users to establish not only social connections with unrelated parties based on common interests, but also to gauge trustworthiness and reliability from verified transactions. Such connections can potentially lead to increased sharing activities among users and enlarge social and business networks.

One goal of the inventive disclosure is to overcome deficiencies and limitations of traditional credit-based lending with a platform for users to build credit and verified trustworthiness through engaging in verified transactions in order to provide a basis to encourage lenders to share with them in future transactions. Such verified trustworthiness may be used in conjunction with verified financial capital, cash flow, credit, income, or other financial data and/or social media information to establish overall trustworthiness or credit rankings for users. The systems disclosed herein may be utilized by and allow collaboration between providers and borrowers of various services, skills, goods, spaces, transportation or other subjects of value. By building up connections through prior relationships involving other prior sharing transactions verified by the system, users can establish credit and verified trustworthiness, and establish a basis and history for sharing or borrowing financial resources for loans, goods, or services. Such prior transactions, particularly ones involving sharing which requires travel by one or more users to one or more locations associated with particular transactions for subjects of value, may be verified and authenticated by the system using GPS and LBS technologies, as well as confirmations from users and ratings from additional users. The security and verification of a user's transactions are what help retain users and encourage system use.

Sharing as described herein may include anything from basic subjects such as services, skills, goods, spaces, transportation, etc., to more substantive subjects such as residences, offices, vehicles, etc. After accumulating sufficient sharing transactions and sharing history, and after establishing trustworthiness and creditworthiness, a user may be able to borrow financial resources from another user, such as a loan which would otherwise not be available through conventional lending institutions. It is anticipated that connections by users may be built at various levels, and may include regular connections involving regular sharing and business connections involving business sharing. In essence, users may be deemed trustworthy through their demonstrated reliability, and their ability to borrow or share goods, services, or money is not necessarily tied to income, net worth, or credit score.

One or more business connections to another user may also provide a certain level of confidence to a potential lending user that the potential borrowing user can be trusted. Business sharing may be for money or another subject of value (office space, furniture, etc), and may include regular business connections for sharing. The types of transactions contemplated herein may include, for example, sharing any form of goods such as chairs, ice skates, a snowblower, etc., providing services such as yardwork, plumbing, maintenance, cleaning, etc., loaning out spaces such as parking spaces, residential rooms, conference rooms, etc., providing particular skills such as fixing computers or doing electrical work.

In a goods sharing transaction, the lending and borrowing users' mobile units are tracked using GPS or other location based technology throughout the transaction. For example, the borrowing user may "check in" at the beginning of a trip to the lender (or vice versa). The system determines and records the borrowing user's geolocation at the time the user begins the trip based on the borrowing user's mobile device, and/or the lending user's geolocation based on the lending user's mobile device. The system may collect time and location data during one or more points in time while one user travels to the other. When the two users meet, they can both check in again and the system records time and location for each mobile unit, and potentially the distance between them. Once goods are exchanged, the borrowing user can check in and indicate he/she is now returning home or to another location with the borrowed goods. When the borrowing user returns the goods, the process may be repeated. When a new borrowing user borrows the goods from the same lender, the process is repeated with the new borrowing user. In this manner, the system provides a level of authentication indicating that the transactions actually occurred. In a services sharing transaction, the system may track a service provider's mobile unit and the recipient's mobile unit over time in the same manner, how long the service provider stayed at the service location, whether the service provider stays within a predetermined distance of the service location, etc. In a space sharing transaction, the system may track borrowing user's mobile devices as they travel to the shared space (e.g., a parking space). The system may additionally track an exchange of money online for each transaction.

In certain embodiments, the system disclosed herein may calculate an average value of each of a plurality of transactions completed for a particular user, and an average cash flow over a given time period (e.g., a month). The larger the gap between a user's accumulated credit points and the amount of money or the value of the subject the user needs to borrow (e.g., assuming the accumulated credit points are higher), the easier it may be for the borrower to find a lender of the money or non-monetary subject of value. In other embodiments, the total amount of credit points accumulated for one or more transactions may not correspond directly to the total amount or value of the transactions, but rather may be only a portion or percentage of the total amount or value of the transactions. Therefore, the potential for easier access to fast loans may encourage users to participate in verified sharing activities through the system.

In certain other embodiments, the credit points assigned for a particular transaction may sometimes be based on the value of the subject matter of the transaction, not merely the cost or value of sharing it.

In certain embodiments, the number of transactions users engage in may count toward the establishment of a credit score or rating, a creditworthiness score or rating, a trust score or rating, or a trustworthiness score or rating (further discussed below with respect to FIGS. 5-8). For example, as users engage in an increasing number of verified transactions, their score may be increased by a predetermined amount or in accordance with a predetermined algorithm or a predetermined set of rules. In this manner, the system allows a lender of non-monetary subjects of value to build up a trustworthiness score or rating in order to later become a borrower of money. Also, verifications may apply to financial transactions such that money exchange can be done through secure means such as an intermediary payment system, which may collect funds from a lender and redistribute them to a borrower. The intermediary may be a clearing house or other institution that provides means for accountability for not only payments, but also potential disputes.

The credit or trustworthiness score or rating may be accurately and reliably assessed through regular, business, and social connections, ratings, time, and/or transaction history. A user's trustworthiness score or trustworthiness rating may then be used by lenders in evaluating whether to share monetary (financial) or non-monetary resources, either with or without collateral or alternatively, with or without guarantor(s). Therefore, the trustworthiness score allows users with financial or other non-monetary resources to decide whether or not to extend loans to other users who may have a temporary need for such financial resources. Eventually, collateral for transactions between the same users may become obsolete due to the trustworthiness score and built-up relationships with different levels of connections over time.

In accordance with certain embodiments, a user can build a trustworthiness score or rating on the system from a record of transactions, user ratings, and length of time using the system's platform, as well as from actual or potential income. The user's overall trustworthiness score can change depending on the number of successful transactions, positive ratings and other factors utilized, and may be used by users for borrowing financial resources, either with or without collateral. It will be appreciated that sharing financial resources or other subjects of value allows lending users an alternative to depositing money (or selling another subject of value for money and depositing the money) into a bank, where interest rates are notoriously low and provide no real, quantifiable benefits, financially or socially. Any user of the systems disclosed herein can potentially become a lender if they build up sufficient trust within the system's community by way of a credit ranking, and/or through a plurality of individual users vouching for the proposed lending user. Users can gain real benefits from loaning financial or other resources for short durations compared to depositing the same financial resources into a bank while simultaneously helping one or more borrowing users financially and socially who are temporarily in a difficult financial situation, but trustworthy, while still collecting interest as a lender. Borrowing users who receive such financial or other shared resources of value are also likely better served by using the systems disclosed herein because they may be able to avoid selling valuable possessions. Certain users will no longer have to resort to, for example, using pawn shops to sell treasured or valuable subjects for less than an ideal amount in order to procure cash to purchase the desired subject of value. The borrowing user's trustworthiness score will help a lending user evaluate whether or not to extend financial resources, and determine whether the borrowing user is reliable and credible based on past transactional history, peer user ratings, and/or actual or potential income.

In certain embodiments, by creating regular connections through sharing with a commitment, bartering arrangements may be achieved in which a borrowing user may not need to pay for anything (or may reduce payment amounts), and may receive special assistance without monetary payment so long as he/she gives a commitment to provide specific skills, services, goods, spaces, and/or transportation goods or services to the lending user and/or to a third-party to the particular transaction. Additionally, if each user who contributes to the sharing cycle also commits to provide other sharing related skills, services, goods, spaces, transportation, etc., then the involved users can become part of a community with larger and larger reach, and an increased ability to obtain more users. Such build-up of social connections can help users engage in social networking, advertise to one another, and market themselves to create future transactions. A person is more likely to transact with another individual if a foundational relationship or prior connection exists between them. In certain embodiments, users may be enabled to determine how they are or may be connected to potential "sharers" or "borrowers," either directly or through mutual friends, based on connections in social networks that include but are not limited to Facebook®, LinkedIn® or any other social networking site. User connections can also be based on previous transactions within a mobile application. A user may be more likely to transact with a stranger after the user discovers an indirect connection between the user and the stranger through previous transactions with other users. In this manner, exemplary embodiments of the inventive disclosure can potentially increase transaction volume. The more detail provided in the connection(s) information, the more likely a user is to transact with the connected user because of the prior history, credibility, and/or trustworthiness verifications.

It will be appreciated that a lending user may be in possession of a subject of value he/she does not need, but which a borrowing user may be interested in borrowing. Unlike a typical transaction in which one user buys a product of value from another user by providing payment, the sharing concept disclosed herein can allow the user to express a commitment to help another user by providing goods, services, spaces, skills, transportation, etc. that he/she possesses, in addition to a monetary payment for borrowing the subject of value. In other words, the consideration for borrowing a subject of value may be a combination of a monetary payment and providing another good and/or service to the lending user. Skills, services, goods, spaces, and transportation can be interchangeable in the transaction. One user can commit to providing a service to another user, even though the original user received a good. Another user may commit to providing a good to yet another user, even though the original user received a space sharing arrangement. Thus, the sharing concept disclosed herein can lead to unlimited variations for sharing goods, services, and/or spaces. The systems disclosed herein may be configured to allow users with regular connections to other users to view these connections. The commitment to a third-party creates a continuing cycle which can subsequently establish a network of connections and obligations of people with monetary value and/or other promises attached to the obligations.

The systems and methods disclosed herein provide a solution to a problem facing present peer-to-peer lending (e.g., accountability of the parties) by giving each user information about the user with whom they are contemplating a transaction. In certain embodiments, such information includes a user's creditworthiness, lending rules for the particular transaction, and background information about the user such as the dollar amount of goods and/or services he/she provides, sharing history (regular and business sharing), which helps a user further evaluate the other party. Exemplary embodiments of the inventive disclosure provide a system and method for calculating the average creditworthiness or trustworthiness score of users that may be utilized, with or without other credit scoring criteria, as an evaluative indicator. Traditional credit scores provided by other companies such as Experian® or TransUnion® only focus on financial indicators, such as payment history or credit line of a user. The inventive disclosure provides a broader and different view of a user as it evaluates behavior and social media community involvement of users and verifies completion of sharing transactions using location and geolocation identifier technology as further discussed below.

A user can also engage in business sharing through a platform displayed on a mobile application, with or without monetary payment. However, a determined value is exchanged between users participating in business sharing. By completing successful transactions and connecting with other users entering into the transactions of both regular sharing and business sharing, a user may build up social network connections based on a variety of factors which may include, but are not limited to, common interests, education, school, job or professional interests, etc. Such social network connections can be factored into the trustworthiness or creditworthiness score assigned to a particular user.

In preferred embodiments, the systems disclosed herein can provide a platform to facilitate social connections based on a user's prior transaction history through mobile device applications and/or web-based media. A user may register and create an account and a user profile in order to utilize various features of the mobile application. Prior to participating in sharing activities, users may have to register with the platform, pass a verification procedure, and then create their user profile by inputting their user ID, geographic location and interests. The user can register in two ways, either by using their already existing profile on one of the social networks or by creating a new profile that can be linked to other social network profiles at any time. The user may have to indicate skills, services, goods, spaces, and/or transportation that he/she possesses or would like to provide, whether he/she would like to share these subjects of value currently or in the future, and what skills, services, goods, spaces, and/or transportation goods or services he/she is looking to receive from other users. A user of the application may create a user profile which includes demographical data, such as gender, age, ethnicity, etc., that can be used for statistical purposes. The user may then initiate sharing and create these various types of connections to other users or third-parties. When listing a subject of value (e.g., available skills, services, goods, spaces, and/or transportation), users may choose to broadly describe various attributes of the subject of value, which may allow them to reach an even larger group of potential users interested in the products or services.

In certain embodiments, the system may offer advanced user targeting options and provide a level of personalization or customization not achievable through other advertising channels. At least four (4) advanced targeting options are contemplated: interest targeting (e.g., where each specific audience may be reached based on a users' self-reported interests, activities, skills, etc.), connection targeting (e.g., where users may be reached based on previous transactions and social connection), custom targeting (e.g., where users may be reached based on the user's skills, services, goods, spaces, and transportation goods or services), and look-a-like targeting (e.g., where users may be reached based on associations by associating skills, services, goods, spaces, and transportation users have been interested in previously, and associating them with similar skills, services, goods, spaces, and transportation goods or services the users may be interested in now). For example, government agencies may use the platform of the inventive disclosure to promote social values to the general public with the goal of achieving specific social, cultural, community economic, and/or environmental outcomes by offering sharing (e.g., access) to numerous parks, museums, recreation facilities, educational events, etc.

As fraud is a big concern to users, the system may require all users to not only be registered, but also verified. For example, during the registration and verification process, the system may require a user to provide a phone number, an email address, and other basic location and identification information. Such information can help weed out dishonest users who would otherwise create multiple profiles in an attempt to exploit the system. Additionally, banking or credit card information may be required during registration, not only for user authentication, but also to ensure the user has the ability to exchange and borrow items of value. Furthermore, in certain embodiments, users may be monitored for suspicious activity such as synchronized transactions, which create a red flag indicative of the possibility that one or more users may be colluding and attempting to take advantage of system resources. Such measures may additionally decrease the risk of dishonest user collusion.

Referring now to FIG. 1, a diagram of an on-line system 100 is shown in accordance with an embodiment of the invention. Network 116 represents communication pathways between users interacting directly or indirectly with on-line server 107 from various types of user devices 104/105/106/110 such as terminals 104, vehicles 105, mobile tablets 106 and mobile phones 110. In one embodiment, the network is the Internet. The network can also utilize dedicated or private communication links (e.g., wide area network (WAN), metropolitan area network (MAN), local area network (LAN), etc.) that are not necessarily part of the Internet. Network 116 uses standard communication technologies and/or protocols. Server 107 presents web pages or other web content, which form the basic interface to user devices 104/105/106/110. User device 105 (e.g., a motor vehicle) may include or contain within it various other user devices, such as, for example, tablet 106, mobile phone 110, a location identifier, geolocation identifier 111, and/or camera 112. These devices may be operatively associated with a display device or display panel configured to allow a respective user to access one or more web pages or user interfaces and provide data to system 100.

In certain embodiments, user devices 104/105/106/110 are used for interacting with servers 107 of on-line system 100. User devices 104/105/106/110 can be any device that incorporates a computer, such as a personal computer (PC), a desktop computer, a laptop computer, a notebook, a smartphone, or the like. A computer as described herein is a device having one or more general or special purpose processors, memory, storage, and/or networking components (either wired or wireless). The device can execute an operating system such as, for example, a Microsoft Windows-compatible operating system (OS), Apple OS X or iOS, a Linux distribution, or Google's Android OS.

Servers 107 may interface with each part of system 100 and allow users to manage and utilize a complex communication network to grant access to a user or simultaneous system access to numerous users. System 100 may have more than one server 107 in a distributed structure with support from data centers located anywhere around the world. These implementations may be communicatively linked and cross-platformed such that a driver user on a computing device is provided with information relevant to the particular transaction, such as, for example, an electronic map display, indicators which display travel times, routes, transaction or route information, user profile and setting information, and/or other information relevant to a user, passenger, lender, borrower, third-party, or service provider. Various features of system 100 can be implemented through remote computing devices that allow method steps to be processed and output by servers 107. Server-side architecture may be implemented through a software program configured to coordinate communication between a module and backend systems that allow bringing up data and image processing, as well as storage and various calculation features.

One or more servers 107 may contain or deploy geographical information system (GIS) 102, processing units 120, non-transitory computer-readable storage medium 101, which may additionally be instantiated as one or more non-transitory computer-readable storage media, and database 103. Database 103 and its system functions may additionally be instantiated through one or more databases 103. Servers 107 may connect to GIS 102 and non-transitory computer-readable storage media 101 to provide system functionalities. Database 103 may be implemented as part of non-transitory computer-readable storage medium 101, where the data may be stored, organized, and analyzed. Processing units 120 may be a type of logic processing unit, such as one or more: central processing units (CPUs); digital signal processors, application-specific integrated circuit, etc. Processing units 120 may be connected through any known system bus structures, including a memory bus with memory controller, a peripheral bus, and a local bus to implement system functionalities.

Figure 2:
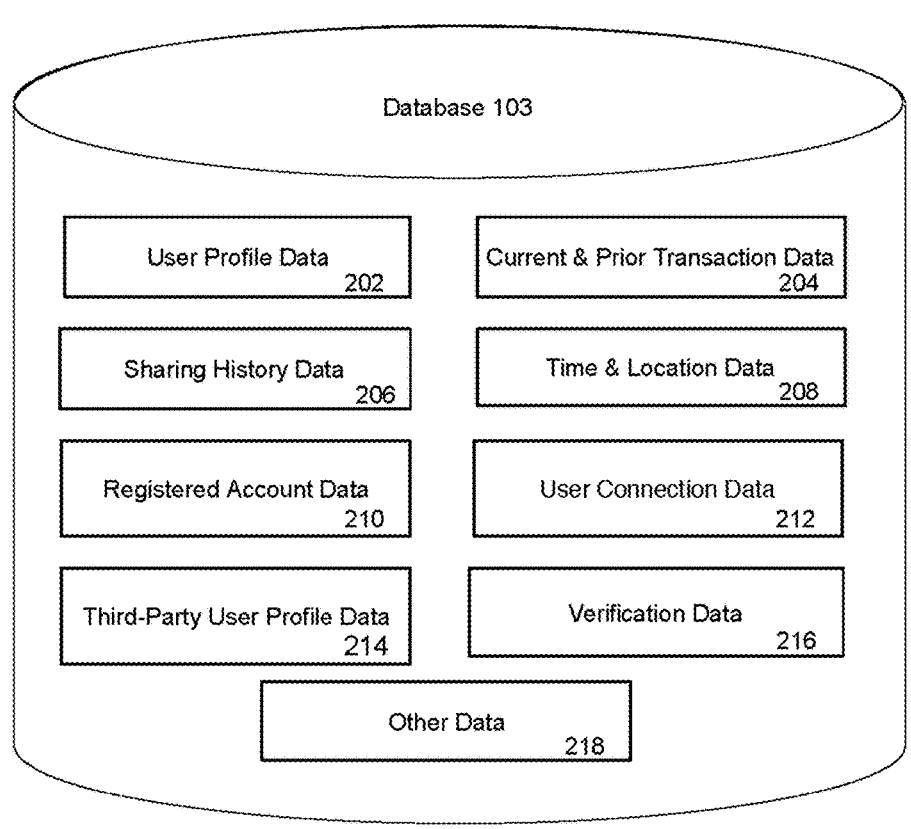
FIG. 2 is a diagram illustrating an exemplary embodiment of the database of FIG. 1, showing how data may be organized, categorized, and stored in accordance with exemplary embodiments of the inventive disclosure.

Turning to FIG. 2, shown is a diagram illustrating the data stored in database 103, and how the organization of the data may be carried out, in accordance with an exemplary embodiment of the inventive disclosure. There are numerous methods of providing databases and data storage media for the organization and retrieval of specific data, and exemplary embodiments of the inventive disclosure are contemplated for use with any appropriate database(s) or storage means. Database 103 may be implemented in a database management system, such as a relational database (e.g., MySQL). In some implementations, database 103 can be located and accessed remotely. Further, while referenced as a database, it may be appreciated that the database 103 may include, but is not limited to, a data storage medium, whether structured or unstructured, relational, or otherwise. Database 103 may be dynamically updated as particular sharing transactions are initiated and completed. Database 103 may store user profile data or user related data 202, current and prior transaction data 204 (e.g., the details of transaction requests for each particular transaction or user), data relating to user sharing history or user behavior/action 206, time and location data 208, registered account data 210, user connection data 212, third-party profile data 214, verification data 216, and other data 218 (e.g., item related data related to the auction subject, map and road data showing routes to and from lending and borrowing users, administrative data for managing the system, communication data between users, etc.) relevant to operation of the system. Database 103 may also store an index of each transaction request that has been requested, completed, partially completed, or abandoned. The index may include user account registration information or user identifications of lenders/borrowers, sharer/sharee, etc., which can be retrieved for reference if needed at any time. In addition, any data provided through the user computing devices 104/105/106/110, may be stored in its own category, and subcategories thereof may be provided.

The non-transitory computer-readable storage media 101 may additionally store computer-executable instructions, such as program modules being executed by a computer. The drives and associated computer-readable storage media may provide non-volatile and non-transitory storage of computer readable instructions, data structures, program modules, and other data for the computer system.

The platform of the application may have a transaction database within database 103 with a recorded history of prior transactions with, for each transaction, calculated trustworthiness factor(s), aggregated trustworthiness factor(s), ratings, the respective connection(s) involved with the transaction, and whether the connection(s) is/are regular or business connections. The transaction database may allow users to track their shared goods over a period of time. In accordance with various embodiments, the systems and methods disclosed herein can offer a large spectrum of advertising opportunities. As social networks gather a large amount of user information, social media advertising can target the right audience in a wider variety of ways than other media or on-line platforms. Stretching beyond general demographic and geographic data, exemplary embodiments of the inventive disclosure can provide a platform for customer accumulation and product awareness in a more efficient and cost-effective way.

Figure 3:
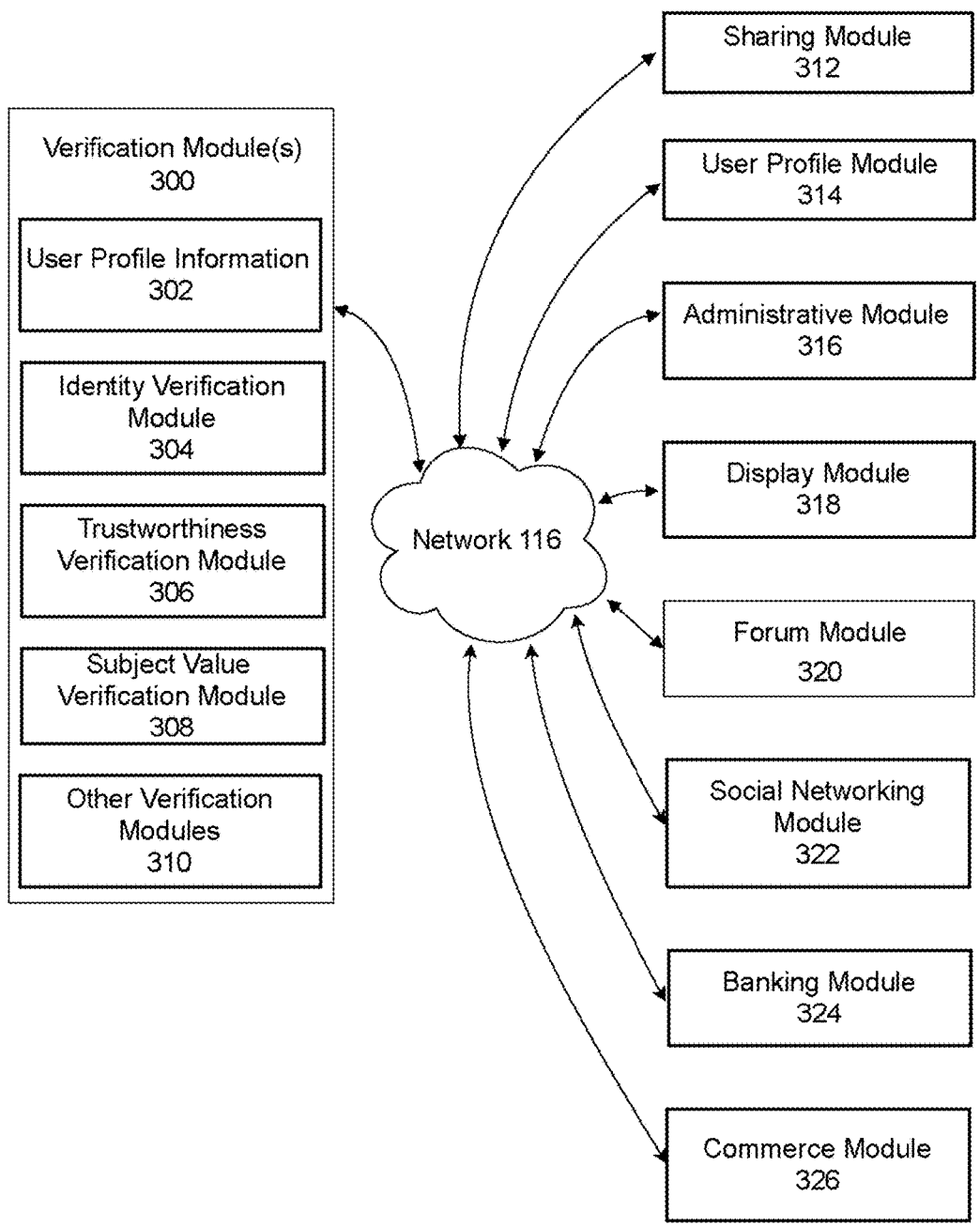
FIG. 3 is a diagram illustrating different modules for verifying transaction trustworthiness in commercial or other sharing transactions in accordance with exemplary embodiments of the inventive disclosure.

Referring again to FIG. 1, with additional reference to FIG. 3, one or more servers 107 may be communicatively connected to user devices 104/105/106/110 (e.g., via applications and/or features implemented on a mobile device). The connection may be through a communicative means such as a link through network 116, and information may be output to a display of one or more computing devices associated with display module 318. The communication means of system 100 may be any means for communicating data over one or more networks or to one or more peripheral devices connected to system 100. Appropriate communication means may include, but are not limited to, circuitry and control systems for providing wireless connections, wired connections, cellular connections, data port connections, Bluetooth connections, or any combination thereof. A plurality of communications means may be utilized in accordance with exemplary embodiments of the inventive disclosure.

User profile modules 314 may each be configured differently, and each may rely on different computing devices with constituent parts to carry out specific functions. The different components within the computing device (e.g., tablets, smartphones, wearable technology such as smartwatches, laptops, PCs, servers, etc.) interact and communicate to share information. Users of system 100 may interact with system 100 through sharing module 312, potentially carried out in part on their respective computing devices 104/105/106/110 through an application. System 100 may be cross-platformed and accessed through different means, such as web portals and/or mobile applications, simultaneously if necessary. For example, a user of motor vehicle 105 may additionally use at least a mobile computing device such as smartphone 110, geolocation identifier 111, and/or camera 112.

The administrator of system 100 may access various administrative functions through one or more administrative modules 316 different from sharing modules 312 used by general users such as lenders, borrowers, vendors, service providers, and third-parties. An administrator may have access to every administration function and can preferably delegate permission to other users of system 100. Sub-level administrators may be assigned permission through, for example, a checkbox system from another authorized sub-level administrator or from the administrator directly.

In certain embodiments, servers 107 described herein facilitate transactions between two or more users. For example, users seeking to obtain accommodations provided by other users are connected via servers 107. A ridesharing system may allow users seeking rides to obtain rides from other users. An on-line marketplace system may allow users to buy, sell, and/or share or loan products, services, or financial resources to other users.

In accordance with certain embodiments, system 100 may include, in addition to the server 107 and database 103 (which may include a user profile database), various modules for verifying transaction trustworthiness in commercial or other sharing transactions in accordance with an exemplary embodiment of the inventive disclosure, including verification module 300 having at least an identity verification module 304 and trustworthiness verification module 306. Optionally, subject value verification module 308 may also be provided to verify the specific subjects of value shared by a user. Other verification modules 310 may also be employed by the system. Those of skill in the art will appreciate that system 100 may also contain various modules such as sharing module 312, user profile module 314, administrative module 316, display module 318, forum module 320, and other modules appropriate for various functionalities (e.g., social networking module 322, banking module 324, commerce module 326, etc.). In addition, conventional elements, such as firewalls, authentication systems, payment processing systems, network management tools, load balancers, and so forth may be utilized.

System 100 may be implemented using a single computer or a network of computers, including cloud-based computer implementations. The computers are preferably server class computers, including one or more high-performance CPUs, and run an operating system such as LINUX or variants thereof. The operations of system 100 described herein can be controlled through either hardware or computer programs installed in non-transitory computer storage and executed by the processors to perform various functions described herein. The various data stored (e.g., user profiles, etc.) can be implemented using non-transitory computer readable storage devices and suitable database management systems for data access and retrieval. System 100 can include other hardware elements necessary for operation, including network interfaces and protocols, input devices for data entry, and output devices for display, printing, or other data presentations.

In preferred embodiments, each user of the system may be associated with a user profile stored in database 103. The user profile can include personally identifying information about the user explicitly provided by the user, as well as profile information inferred by system 100. The user profile preferably includes multiple data fields, each describing one or more attributes of a corresponding user. Examples of information stored in a user profile include biographic (e.g., name, date of birth, home address), demographic, and other types of descriptive information, such as work experience, education history, salary, gender, telephone numbers, email address, etc. A user profile may also maintain references to actions by the corresponding user performed in system 100, such as transactions initiated and completed, pages visited, etc. In certain embodiments, system 100 also allows users to use their user profile from a third-party on-line system in on-line system 100 (e.g., by using a third-party application programming interface (API) such as Facebook Connect). In such embodiments, on-line system 100 may not maintain its own user profile, but instead, may use information contained in the third-party user profile store.

As discussed above, system 100 may include verification module 300 that verifies the reliability or legitimacy of user profile information 302 provided by a corresponding user. Identity verification module 304 may be configured to only verify whether the name of the user creating an account is correct, or alternatively, to verify the reliability, accuracy or legitimacy of other information about the user such as the date of birth, address, image, etc. The system may be configured to require user documentation such as a driver's license, passport, social security card, and/or copies of certifications, degrees, etc.

In certain embodiments, verification module 300 is configured to provide a binary result (e.g., verified or unverified) of the determination of the veracity of user profile information. In other embodiments, verification module 300 may be configured to determine an identity verification score based on available information in database 103, on-line, offline and/or from information submitted by the user. The verification score may, for example, represent a level of confidence that the user profile information provided by the user is correct, based on a predetermined scale (e.g., zero up to a maximum value, where zero represents no confidence that the information provided by the user is correct, and the maximum positive value represents perfect confidence that the information the user provided is correct). Alternatively, the identity verification score may range from a negative value to a positive value, where the negative value represents that it is very likely that the information provided by the user is incorrect, zero represents that it cannot be determined whether the information provided by the user is correct or not, and a positive value represents that is very likely that the information provided by the user is correct.

In certain embodiments, verification module 300 verifies the identity of a user when the user creates an account or a user profile with system 100. In other embodiments, verification module 300 verifies the identity of a user each time the user performs a transaction with system 100. In yet other embodiments, verification module 300 verifies the identity of a user every pre-set amount of time (e.g., daily, weekly, monthly, biannually, annually, every 5 years, etc.).

In certain embodiments, verification module 300 may instead determine that the information provided by the user is correct only if information provided by the user and the corresponding information available in database 103 match. In other words, verification module 300 can reject a user if there is any discrepancy between the identity provided by the user and the corresponding information available in database 103. Alternatively, verification module 300 may take into consideration all information included in a user profile, including information that has been recently modified or information from newly created user accounts, and adjust the score based on the longevity of the on-line account and/or the amount of time since the date of the last modification. In certain embodiments, the verification score for a specific user account may be multiplied by a factor based on the longevity of the user account. By way of example, the multiplication factor may be one (1) if the user profile was created more than a year from the current date, or the number of months since the user profile was created divided by twelve (12) if the user profile was created within the past year. In certain embodiments, instead of calculating a score, verification module 300 may instead compare information from database 103 and information provided by the user for an exact match. If the information does not exactly match, then verification module 300 may reject or flag the user account as unverified.

In certain embodiments, verification module 300 may determine a score for different fields of a user profile, based on the edit distance for each field (e.g., one score for the first name, one score for the last name, one score for the date of birth, etc.) and arrive at an aggregate score to determine or calculate an overall on-line identity verification score. The score for each field can additionally be weighted by a weighting factor to reflect the importance of the field (e.g., first name and birth date are preferably highly weighted since these likely never change, whereas telephone number and email address can be weighted lower because they may change frequently). Alternatively, identity verification module 304 may not take into consideration information that is likely to change, such as phone number and email address. The aggregate score can be normalized and standardized.

Verification module 300 may also be configured to use offline information to determine the reliability, accuracy or legitimacy of a user, such as, for example, information extracted from an image of a user's driver license. Verification module 300 can compare this extracted information to information provided by the user in the user profile. In accordance with one embodiment, verification module 300 can prompt the user to take a picture of his/her driver's license using a webcam, smartphone, or other network-enabled device, and transmit the picture to verification module 300. Verification module 300 can then extract the information from the image provided by the user and compare it to information available in a user profile store. In certain embodiments, verification module 300 may perform optical character recognition (OCR) to the image provided by the user to extract the information needed. If the extracted information from the driver's license matches the stored information, then such matching may indicate that the information provided by the user is correct. In other words, the fact that the user is in possession of a driver's license that accurately matches the stored information supports the inference that the user is who he/she claims to be. Additional or alternative information which may be used to determine the veracity of a user's identity includes credit card information, bank account information, etc.

The verification process may be performed by system 100 or, at different steps of the process, by different systems operated by different entities. In certain embodiments, system 100 can be configured to redirect a user to a third-party service provider that collects this data and sends it back to system 100. In this manner, if the user does not trust sharing sensitive information (i.e., social security numbers, driver license numbers, passports, etc.) with system 100, then the process can be facilitated using a third-party provider. For example, the user may be redirected to a third-party provider who may request his/her offline identification (e.g., an image of his/her driver's license, etc.). The third-party provider may then extract relevant information from the offline identification and send the information to the verification module 300. In one embodiment, the on-line system or the third-party service provider may further analyze an image of a driver's license or any government issued identification for security features to determine whether the document has or has not been counterfeited.

Figure 4:
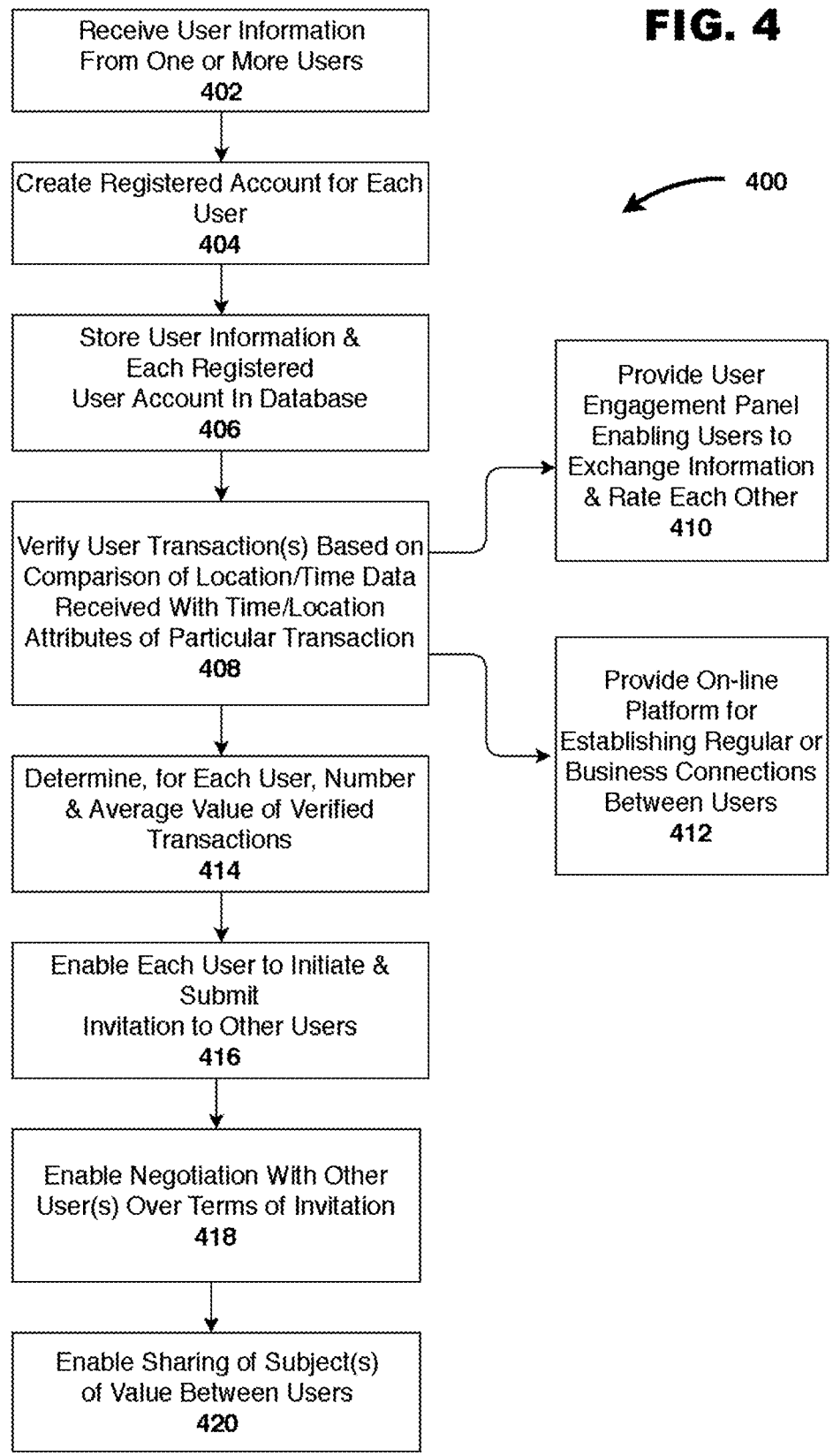
FIG. 4 is a flow diagram of a method for registering one or more users to an on-line sharing system and facilitating connections between them in accordance with exemplary embodiments of the inventive disclosure.

Turning now to FIG. 4, shown is a flow diagram of a method 400 for registering two or more users to system 100 and allowing different types of connections between them. It will be appreciated that the method steps disclosed in FIG. 4, as well as methods disclosed elsewhere herein, may be performed in various sequences. Initially, system 100 receives user information associated with one or more users from one or more user profile modules 314, computing devices, internet web pages, emails, phone calls, or other means (Step 402) and creates a registered account for each user based on the user information received at Step 402 (Step 404). Users may register with a system platform, pass a verification procedure, and then create their user profiles by inputting their user IDs, geographic locations and interests as discussed above. In certain embodiments, system 100 may be configured to check, for example, a social media account for user identification, demographic data, or geographic location, and to enable one or more users to link a third-party social networking account to the social media account.

System 100 may store the user information and each registered account in database 103 (Step 406) and verify one or more transactions of users based on comparisons of location data and time data received from mobile computing devices associated with the users for the transactions with location and time-based attributes of the transactions as discussed below with respect to FIG. 5 (Step 408). In certain embodiments, system 100 can be configured to provide a user engagement panel or forum module 320 for enabling a plurality of users to exchange information through system 100 regarding sharing, and a rating system or module for the plurality of users to rate or review one another during or after each transaction (Step 410). In this manner, two or more users can be connected. As discussed above, the ratings of other users can be one of the additional factors used in calculating a particular user's trustworthiness rating.

In certain embodiments, posts to the forum or user engagement panel may be subject to ratings from other users in part to prevent fraud and abuse and help users avoid bad transactions. Ratings may be available once a transaction between two users is completed. The forum can be configured to allow users to share ideas, comments, questions and suggestions regarding the use of, for example, public spaces. The rating system or module can incorporate two types of ratings, such as "lender/borrower rating" and an "appreciation rating." With respect to the lender/borrower rating, a lending user may receive a "lending" icon after sharing with a borrowing user; a borrower may get a "borrower" icon after receiving an item from a lending user. If the borrower re-shares a subject from a particular transaction, then the borrower icon may disappear because he/she then becomes a lending user in the system for that particular transaction and subject of value. The borrowers may assign an appreciation rating to the lending users, which may be configured as, for example, one to five stars based on the level of appreciation. Reasons may be given by the borrowers for the appreciation rating, especially for lower ratings. These ratings may also be used to establish user's creditworthiness or trustworthiness rating based on the circle of connections the user has and the number of ratings and feedback users provide. Since users may only be able to connect and rate users they have first-hand experience with based on prior transactions, the ratings and feedback they provide may reflect their actual experiences and be a more reliable source of information to further establish the user's character and habits.

In certain embodiments, system 100 can be configured to provide an on-line platform for establishing regular or business connections between users and can include a search mechanism capable of searching whether users have previous connections or transactions together (Step 412). System 100 can store the connections associated with the users in database 103. The connections can include one or more social connections or one or more regular connections from prior sharing (e.g., for a price following, for example, completion of a predetermined number of sharing transactions). The connections may include one or more business connections from prior financial sharing, with or without monetary consideration. The stored connections may be utilized as one of the additional factors used to calculate the trustworthiness rating.

In accordance with certain embodiments, system 100 may be configured to identify connections between a set of two or more users and obtain permission from at least one of the users to share information and send notifications to other users with common interests. The users can verify social network connections prior to engaging in any sharing activity by providing permission to connect. In certain embodiments, system 100 can analyze direct or indirect social network connections of a set of the users. The direct connections may be connections between the set of the users who previously completed transactions with one another. The indirect connections may be connections between the set of the users who completed no direct transactions with one another, but who are connected through other users in common.

For each user over time, system 100 can determine the number and average value of one or more verified transactions the user has completed over a particular time period, including payment for the subject of the transaction, either as a sharing user or as a borrowing user (Step 414), which may be used in determining the one or more trustworthiness factors. Optionally, system 100 enables a user to initiate and submit an offer of invitation to one or more other users to share a subject of value (Step 416). In one embodiment, user preferences, offers, and requests for a particular transaction may be submitted, stored, and dynamically updated in database 103. Such offers and requests may include information associated with one or more locations of the desired transaction, a designated start time, and a designated end time as discussed above, as well as any relevant details about the subject of value. According to an exemplary embodiment of the inventive disclosure, a location determining apparatus may be used to identify the location of the users that are willing to participate in sharing activities. Some of the users may find it more practical to only remain within the certain locations, boroughs or districts, as it is not only easier to relate to people from the same community but is also safer and less time-consuming. The users may be then able to preset in their profiles location preferences to be only be informed if there are sharing opportunities they are interested at in within preset location parameters. An interactive map may also allow a user to approximately locate other users they have transacted with in the past, in order to assess any patterns of transactions. Users from certain countries or locations may be more active or more credible and trustworthy when transacting using exemplary embodiments of the inventive disclosure.

In certain embodiments, a sharing (lending) user may search a platform of system 100 to look for users with pre-set trustworthiness ratings in a particular geographic region who are looking to borrow a subject of value which is the same or similar to that which the sharing user desires to lend and may submit offers to those borrowing users. In response to a query from the lending user, system 100 may then search database 103 for any matching borrower user requests. Such matching may be based on similarities in the subject of value and/or geographic regions specified by the users. Alternatively, the sharing user may be able to search database 103 directly and find users. System 100 can be configured to allow anonymous contact between these users through system 100, and give each user the opportunity to review one another's profiles, information, trustworthiness ratings, etc.

In certain embodiments, a borrowing user may search the platform of system 100 to look for users with pre-set trustworthiness ratings in a particular geographic region who are looking to share a subject of value which is the same or similar to that which the borrowing user desires to borrow and may submit offers to those lending users. System 100 may be configured to allow negotiation of one or more terms of a particular transaction by enabling one or more other users to review the offer of invitation initiated by either the lending or borrowing user (Step 418), and either make a counter-offer containing different terms or reject the offer of invitation. System 100 can then facilitate sharing of one or more subjects associated with the particular transaction between the users, whether the sharing is for a price, or for financial lending (Step 420).

Figure 5:
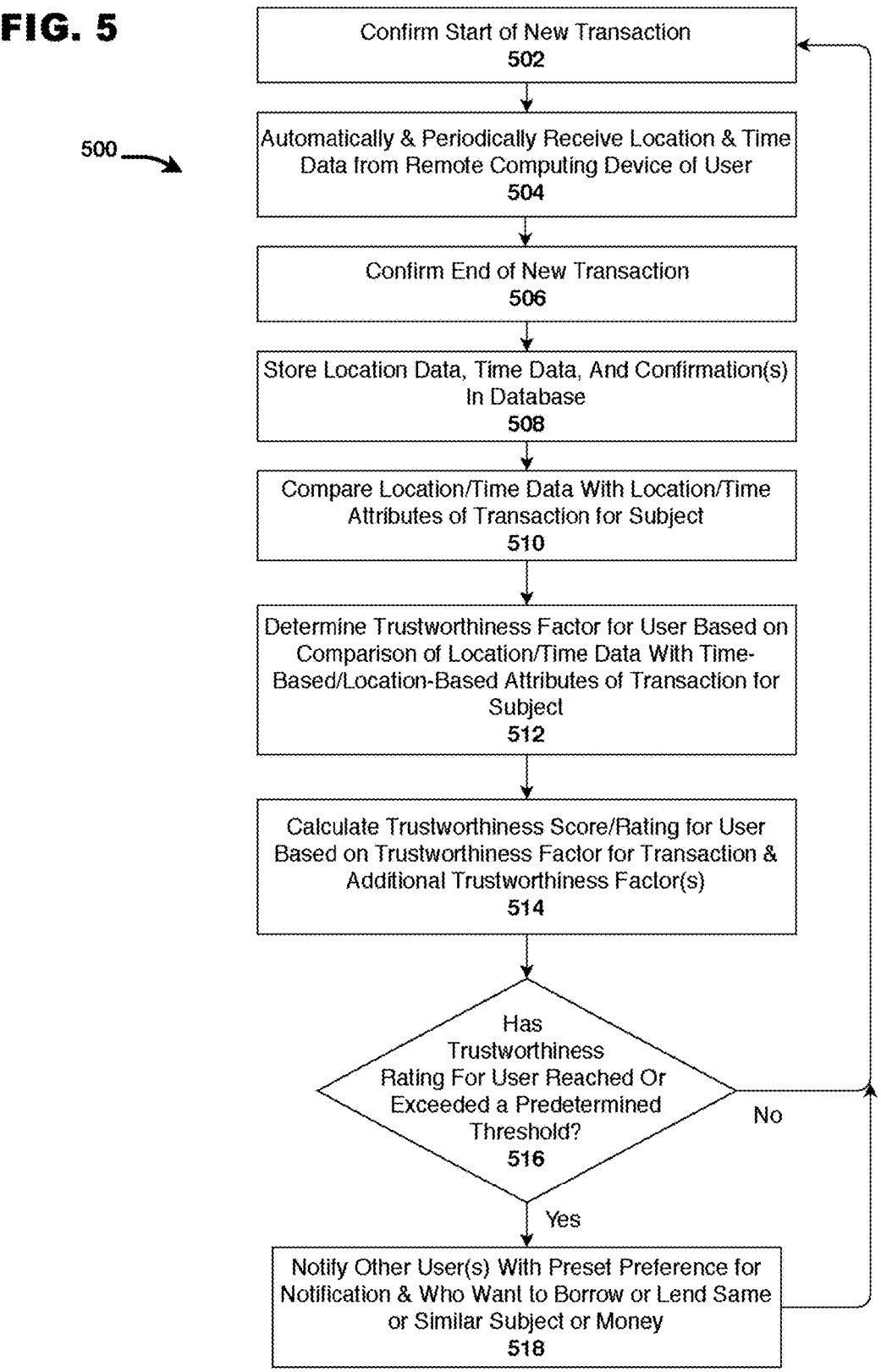
FIG. 5 is a flow diagram of a method for verifying compliance with location-based attributes or time-based attributes of a particular transaction in accordance with exemplary embodiments of the inventive disclosure.

Turning now to FIG. 5, shown is a flow diagram of method 500 for verifying performance of a particular transaction in accordance with exemplary embodiments of the invention. Initially, system 100 confirms the start of a new transaction (Step 502), and system 100 automatically and periodically receives location data and time data from a remote computing device of a user associated with the transaction (Step 504). In certain embodiments, the particular transaction might be for sharing goods such as chairs, a bicycle, a table, a tennis racket, or any other item of value which might be loaned, or a space such as a parking space, an office space, a conference room, a rental space, a room for rent, or any other space which can be loaned or leased. The particular transaction might additionally or alternatively be for money or a service provided by a vendor, such as a plumber, an electrician, a carpenter, etc.

System 100 may be configured to begin monitoring a user's location and time when the user presses a start button or other icon on a system interface, such as a user interface configured by an application running on the user's phone at the start of the new transaction. Once the user reaches the transaction location, both parties (e.g., the lending user and the borrowing user) can confirm that they are at the lending location and/or meeting spot for the particular transaction, and system 100 can authenticate this by additionally receiving location and time data from the mobile device of the borrowing user. System 100 next confirms the end of the transaction (Step 506) by receiving, for example, confirmations from both users at the end of the transaction, comparing the current time with a designated end time for the transaction, and/or simply receiving location and time data revealing that at least one user is leaving the transaction location.

At the confirmed conclusion of the transaction, system 100 stores the automatically and periodically tracked location data and the time data for the mobile computing devices of the lending and/or borrowing users in database 103 (Step 508). System 100 preferably tracks the location and time data of at least one of the mobile devices of the users for at least a duration of a particular transaction, and/or travel of one or more users to the designated transaction location. It will be appreciated that all mobile computing devices associated with users associated with the particular transaction may be tracked at all times, and that such data may be stored in database 103. However, it will also be appreciated that system 100 may alternatively receive location and time data at specific check-in points during the particular transaction (e.g., at a start, midway through, and at an end of the particular transaction). By verifiying that, for example, a mobile device of a borrowing or lending user has moved from location L1 at time T1 to location L2 at time T2 on the same day), system 100 provides authenticating location-based information indicative of an actual transaction occurring between two users rather than a fraudulent (fake) one between colluding users of the system. In other words, if a lending user is loaning out chairs from a location L1, and the system tracks a plurality of different users travelling to location L1 during different transactions, then such data provides evidence of a bona fide safe lender with a pickup location L1. System 100 may also compare the stored location data and time data in database 103 for the particular transaction with one or more time-based attributes or location-based attributes of the particular transaction (Step 510). For example, the particular transaction may have a designated start time, a designated end time, or designated time intervals during a day, week, or month.

Next, system 100 determines a trustworthiness factor for at least one of the users of the transaction based on the comparison at Step 510 (Step 512). The system can be further configured to assign the trustworthiness factor based on the extent to which the tracked location data and time data match the time-based attributes or location-based attributes of the particular transaction (e.g., whether a user arrives at a designated start time, leaves at a designated end time, stays at the location for at least a portion of or all of a designated time period for a service, etc.). System 100 may also utilize the verified value of the subject of a particular transaction and/or the verified completion of payment for the particular transaction to determine the trustworthiness factor. Additionally, predetermined rules may establish a correlation between the successful completion of particular transactions and the assigned trustworthiness score or rating (e.g., high subject value transactions may be awarded a greater weight when assigning a trustworthiness factor than lower subject value transactions).

System 100 calculates, for at least one of the users, a trustworthiness rating (or an updated trustworthiness rating) based on the trustworthiness factor for the particular transaction and at least one additional trustworthiness factor (Step 514). The additional trustworthiness factor can be based on, for example, prior transaction data associated with one or more completed prior transactions, one or more ratings from additional users, a credit worthiness score, an income, information from a social networking account, or other types of information, such as receipt of confirmation or acknowledgement from both parties that the particular transaction has been successfully completed.

In certain embodiments, system 100 can determine whether or not the particular trustworthiness rating associated with the user reaches or exceeds a predetermined threshold (e.g., reaches the predetermined threshold upon completion of the current transaction) (Step 516). If not (No, Step 516), then the system looks again for the start of a new transaction (Step 502). If the particular trustworthiness rating of a user reaches or exceeds the predetermined threshold (Yes, Step 516), then system 100 can be configured to notify a particular one of a plurality of additional users who has pre-set a preference for receiving such notifications regarding a user offering a desired subject of value (Step 518). For example, a user may be able to establish filters for receiving such notifications, including, for example, geographic radius of other users, subjects, etc.

It will be appreciated that such notification may occur at any alternative time, such as, for example, when a user's rating reaches the predetermined threshold based on an improvement of one of the additional trustworthiness factors (e.g., a total number of transactions, average monetary value of authorized transactions, a more positive credit history or score, additional positive ratings from other users, etc.). The system can notify, for example, a potential lender who wishes to borrow a particular shared subject of the trustworthiness score of the user looking to share the subject and connect the two users to complete the sharing transaction. If the particular trustworthiness rating for a particular user does not reach or exceed a predetermined threshold, then system 100 can simply wait for the user to start a new particular transaction at Step 502. Such notifications may occur via user engagement panel/forum module 320 on a display screen of, for example, mobile device 110.

As shown in FIG. 9, the notifications may contain one or more indicators representative of the trustworthiness rating of the particular user. The indicators may be displayed in different formats. For example, if the particular user's trustworthiness rating has exceeded the predetermined threshold, then the indicator may appear as a green color using any shape or form (e.g., star 900 in green, check mark 902 in yellow, or circle with cross-through 904 in red). The indicator may also include the trustworthiness rating 906 or level of the particular user. The indicator(s) may be deployed using one or more symbols or combinations thereof to represent various trustworthiness aspects or risk levels of a particular user. In other embodiments, a notification may be sent with a yellow indicator when the particular user is within a predetermined range (e.g., above or below) the predetermined threshold. In yet other embodiments, the system may enable the lending user to look up the particular user on the system. If the particular user's trustworthiness rating is below the lending user's predetermined threshold and/or not within the lending user's predetermined range, then a red indicator may be displayed on the lending user's mobile phone 110. In accordance with other embodiments, an indicator may be displayed indicative of other risk factors. For example, if a particular user has only engaged in a small number of transactions (e.g., 1-3), but each was for a large amount of money, then the user may have a higher than usual trustworthiness rating for such a small number of transactions. Such user may still pose some risk to a borrower. For example, such user would not have a proven record of consistently loaning or returning transaction subjects. Additionally, while the systems and methods disclosed herein dramatically reduce the chances of collusion (e.g., fake borrowers), a non-bonafide "lender" could theoretically still collude with other "borrowers". A larger number of verified transactions using GPS data and a larger number of different users provide further verification. The indicators communicated in notifications may similarly be configured to reflect these situations using different formats depending on the number of transactions, the average agreed upon value of the transaction, the length of time which has elapsed since the user's last transaction, etc).

In certain embodiments, system 100 may be configured to identify, based on the location data and the time data, that at least one of the remote computing devices of the users are within a pre-set acceptable distance of a transaction location associated with the particular transaction, between a designated start time and a designated end time also associated with the particular transaction. System 100 may also track whether or not the mobile device(s) are within the pre-set acceptable distance of the transaction location (and/or within the pre-set acceptable distance of one another) for an entire time period between the designated start and end times associated with the particular transaction, or for at least a pre-set amount of time based on the one or more time-based attributes of the particular transaction. It will be appreciated that by verifying completion or partial completion of the particular transaction by inference based on the location data and the time data, in conjunction with confirmation of payment, system 100 provides a way of verifying that loaning or lending actually took place (as opposed to colluding users who simply exchange money back and forth to build up fake trustworthiness ratings). For example, greater travel and time requirements of the particular sharing transaction (verified by GPS or other location data) may be more indicative of a bonafide transaction.

By verifying actual completion of a particular transaction using location and time verification with location and time identifying technologies (e.g., GPS, clock, etc.) on mobile devices, system 100 makes it difficult for users to commit fraud. The geographic-location information received by system 100 may comprise signal-information associated with a Global Positioning System (GPS) signal, a Wi-Fi signal, a BLUETOOTH signal, a cellular signal, or a near field communication (NFC) signal. In certain embodiments, the location of mobile device 110 equipped with cellular, Wi-Fi, Global Positioning System (GPS), or other suitable capabilities may be identified with geographic-positioning signals. As an example, mobile device 110 may include one or more sensors that facilitate geo-location functionalities. System 100 may process sensor inputs by mobile device 110 (e.g., a GPS sensor signal) and display in the device's graphical user interface a map of a location corresponding to the GPS sensor signal). Such functionality may be implemented by a combination of hardware, software, and/or firmware. Geographic-positioning signals may be obtained by cell tower triangulation, Wi-Fi positioning, or GPS positioning. In certain embodiments, a geographic location of an Internet-connected computer can be identified by the computer's IP address. System 100 may incorporate additional functionalities using the geographic-location data of mobile device 110, such as, for example, providing driving directions to users during a sharing transaction, displaying a map of a current location or a location attribute (e.g., a meeting point) associated with a particular transaction), or providing information of nearby points of reference such as restaurants, gas stations, etc. A web browser application may access a mapping library that generates a map containing a GPS location obtained by a device driver interpreting a GPS signal from a GPS sensor, and display the map in the web browser application's graphical user interface. In yet other embodiments, the location of a user may be determined from a search history associated with the user.

It will be appreciated that any dishonest users who try to commit or induce fraudulent transactions using system 100 would have to somehow create the location and time data for each transaction, either themselves or using others, which would be extremely time consuming and cost prohibitive. Additionally, system 100 can be configured to decrease trustworthiness scores or trustworthiness ratings, or minimize any increases to trustworthiness scores or ratings, if a plurality of transactions are between the same two users rather than between a lending user and a plurality of borrowing users or third-party users (e.g., third-party beneficiaries), each of whose mobile devices may be tracked. In other words, transactions between a lending user and a plurality of borrowing users whose separate travels have been tracked and verified by GPS and time tracking devices indicate a high likelihood of legitimacy of a lending user.

Additional factors used in conjunction with the trustworthiness factor to calculate the trustworthiness rating may be based on prior transaction data. The prior transaction data can include, for example, prior trustworthiness factors based on comparisons of time-based attributes or location-based attributes of the completed prior transactions with corresponding tracked location data or tracked time data for the remote computing devices corresponding to the respective prior transactions. The prior transaction data may include a number of verified prior sharing experiences, a value of one or more subjects verified to have previously been shared, or one or more verified locations where a subject of value was previously shared.

In certain embodiments, proposed loans by lenders can be backed (e.g., insured) with a money-back option by another user or a third party, which gives further security to the lender that he/she will be paid back. In this manner, a borrowing user who needs a loan can secure it, a lending user can reap the benefit of collecting interest, and a third-party insurer can promise to pay the lender back the loan in the event of a default in exchange for collecting a portion of the lending user's profits. Such third-party insurer can base his/her decision to back a loan based on the borrowing party's credit rating and various credit factors as calculated by the system.

For a borrowing user, having a mutual connection on the system with a potential lender may help the borrowing user secure a loan or even procure a more favorable interest rate from the lender. Similarly, a lending user having a mutual connection on the system with a potential borrower may help the lender determine the borrower's trustworthiness. A lending user may stipulate, for example, that a borrower must have one or more mutual connections, or may further stipulate that a connection be from one of the system's regular sharing or business sharing platforms. Moreover, a lender can set a predetermined threshold amount regarding a minimum trustworthiness score for a borrower. A lending user can make different stipulations about the potential loan in order for the borrower to be deemed eligible.

Figure 6:
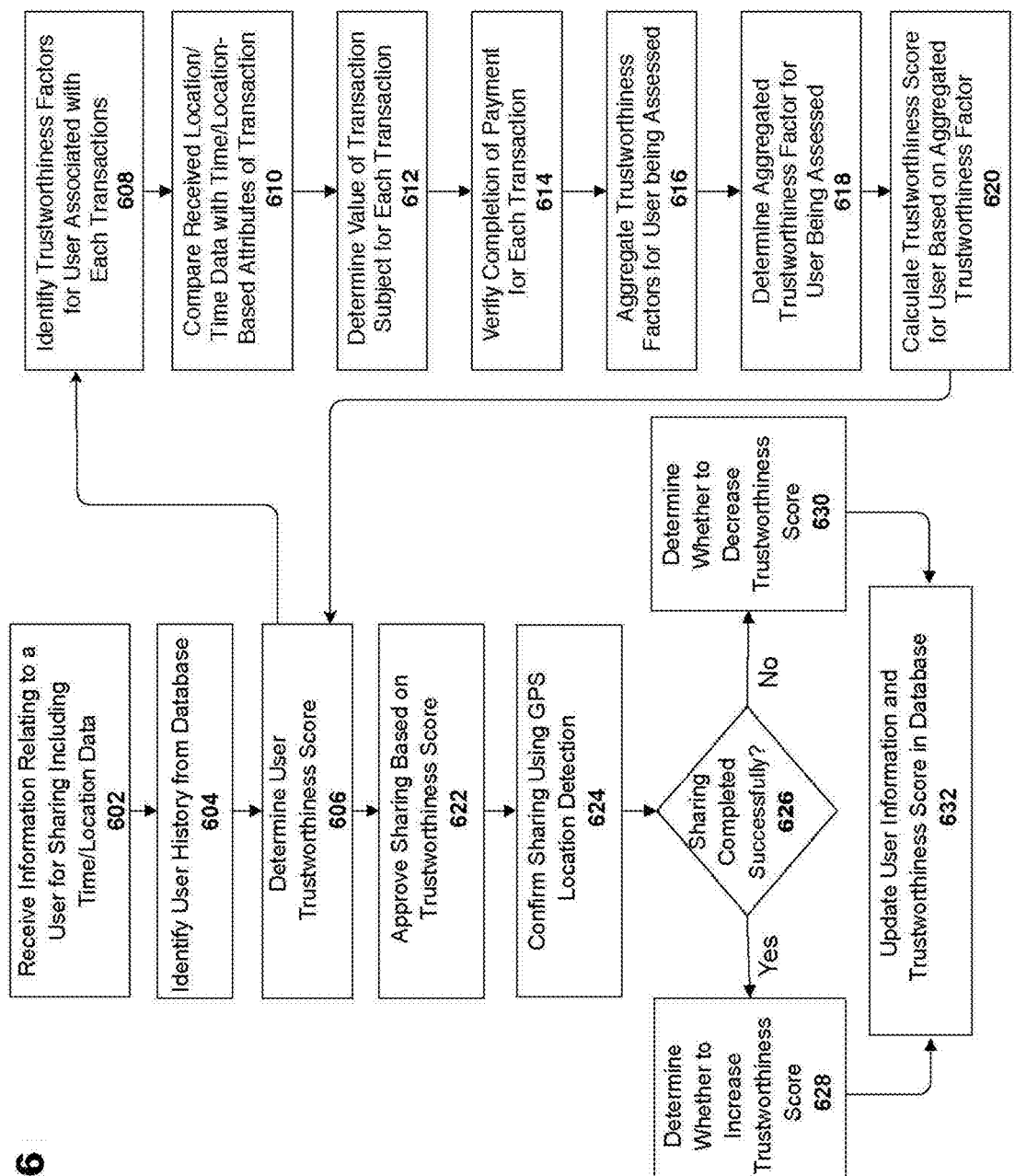
FIG. 6 is a flow diagram of an exemplary method for determining an updated trustworthiness rating for a user associated with a transaction in accordance with exemplary embodiments of the inventive disclosure.

Referring now to FIG. 6, an overall flow diagram is shown illustrating a method for determining the trustworthiness of a user of the on-line system in accordance with exemplary embodiments of the inventive disclosure. Initially, user profile module 314 may prompt the user to input information about him/her (e.g., information related to sharing transactions, identification information, etc.) through one of user devices 104/105/106/110, which is received by system 100 (Step 602). This information may be received from the user at the time the user creates a user account, from a user profile in system 100, or through an account registration page or user profile page via a website or user interface as discussed above. System 100 may then identify any historical data or information about the user, including, for example, the user's sharing history stored in database 103 (Step 604). For example, if the user previously utilized system 100 for a transaction as a lender or a borrow, or if the user previously created an account but never used it, then the user's information can be retrieved from database 103 by social security number, name, address, credit card number, or other means.

At step 606, system 100 then determines a trustworthiness score for the user. As illustrated in FIG. 6, shown is a flow diagram of a trustworthiness score calculation in accordance with an exemplary embodiment of the invention. As shown, system 100 first determines, for a particular transaction, one or more trustworthiness factors for a user associated with that particular transaction (Step 608). In doing so, the system may perform a comparison of location/time data received from a user's remote computing device (further discussed below with respect to FIG. 7) with time-based attributes or location-based attributes of the particular transaction (Step 610). In addition, system 100 may determine the verified value of the subject (i.e., good or service) of the particular transaction (Step 612), and/or the verified completion of payment for the particular transaction (Step 614). Once the trustworthiness factors are determined or identified, system 100 aggregates the trustworthiness factors for the user being assessed (Step 616) and determines an aggregated trustworthiness factor based on the trustworthiness factors associated with the particular transaction, and may also determine at least one additional trustworthiness factor (Step 618). The additional trustworthiness factor may be based on the current or historical transaction data stored in the one or more databases 103, or other information associated with the user's profile. At Step 620, system 100 calculates a trustworthiness rating or score for the user based on one of the aggregated trustworthiness factor for a particular user, ratings from additional users, a known credit worthiness score, an income, information from a social networking account, and/or other relevant factors. The users' trustworthiness rating or score may be calculated based on a combination of other additional factors, such as, for example, a length of platform utilization and current or potential income accumulated through sharing activities. The trustworthiness rating or score of a particular user may be determined or updated every time the particular user is involved in a transaction, or every pre-set amount of time (e.g., daily, weekly, monthly, biannually, annually, every 5 years, etc.).

It will be appreciated that determining the trustworthiness score for a particular user can increase the confidence of other users in, and thus the likelihood of contacting and interacting with, that particular user. Users of system 100 who engage in transactions offline which necessitate some form of user interaction or travel (e.g., sharing a ride, sharing an accommodation, sharing goods or services, etc.) may feel safer and/or more confident that they are not dealing with a fraudulent or dishonest person if trustworthiness has been previously and repeatedly verified. For example, system 100 can be configured to allow another user to check the particular user's past transactions to assess the credibility or success rate of the user in completing prior transactions. Such functionality provides greater transparency among users. A rating system or module (further discussed below) can allow users to rate one another regarding skills, services, goods, spaces, and/or transportation goods or services shared, and provide a verification mechanism to prove that the user indeed possesses the skills, services, goods, spaces, and transportation goods or services as advertised through the platform.

The users' creditworthiness or trustworthiness rating or score may be calculated based on a combination of other additional factors, such as, for example, length of platform utilization and current or potential income accumulated through sharing activities. For example, suppose User B has been using the system platform for 6 months and has engaged in several sharing activities for a price (e.g., User B has helped several other users repair their computers and has accumulated a total income of $450). If User B needs to borrow $200, his/her demonstrated cashflow and completion of prior transactions on the system provides one indicator that he/she can repay the loan. In certain embodiments, User B will be deemed to have accumulated sufficient credit to borrow $200 from members of the community through using the platform for just 6 months. Other factors may influence a user's creditworthiness profile, such as the total number of transactions the user has engaged in, the kind of connections involved, the number of positive or negative ratings from other users, the content of reviews of current or prior transactions with which the user has been involved, the period of time that the user has been registered with the system and engaged in sharing activities, the average perceived value of the skills, services, goods, spaces, and transportation goods or services that the user provides, etc. In certain embodiments, the system may calculate a user's average cashflow per time period (e.g., day, week, month, year) based on the average income the user receives per time period for sharing transactions (e.g., loaning goods, parking spaces, rooms for rent, etc.) in exchange for monetary compensation from borrowing users. The system may also compute not only the total number and amount of the transactions, but also, an average length of time between subsequent transactions during the total time period over which the transactions were completed. In this manner, a second lending user can view the cashflow of a first "lending user" who now desires to borrow money from the second lending user. In other embodiments, the system can enable the second lending user to view the first lending user's actual cash flow each month rather than an average cash flow or a total cash flow. In yet other embodiments, the established cash flow may be multiplied by a multiplier (M) depending on, for example, the frequency of the transactions (e.g., a high frequency may be indicative of high reliability, and vice versa) for credit purposes or risk factor calculation. Conversely, in an embodiment where a user establishes small number of transactions (low frequency), the established cash flow may be divided by a multiplier for credit purposes or risk factor calculation. Similarly, if a number of transactions are with one user, the established cash flow may be divide by the multiplier, and vice versa.

In preferred embodiments, a user may be evaluated based on the locations of his/her transactions and verified using GPS or other location-based services. For example, system 100 is preferably configured to enable a user to search for something he/she needs within a certain geographic region, and to allow the user to view an interactive map that shows approximate locations of shared subjects of value relevant to the user's search criteria. The locations may be kept approximate however, for privacy reasons, and grouped by city block, street, or city. GPS capabilities may be integrated to identify users within a pre-determined distance from specific locations where users may connect due to common interests. Depending on user activity, the system may be configured to automatically detect common interests between users who have registered within a forum that generates notifications.

As discussed above, exemplary embodiments of the invention incorporate sharing for monetary value or exchange, including business sharing through business connections. The business sharing feature may similarly integrate GPS capabilities for efficient business sharing since approximate geo-locations allow a user to find the things they need when available within a reasonable distance and price range. Users may also be allowed to negotiate the terms for sharing skills, services, goods, spaces, and transportation goods or services, in addition to the terms for financial resource sharing.

Referring again to FIG. 6, system 100 can be configured to approve a particular user for sharing a subject of value based on a trustworthiness score at or above a predetermined threshold (Step 622). As shown, such approval may occur before the new transaction (e.g., before Steps 608-620) and based purely on historical data (e.g., prior transactions). In preferred embodiments, such trustworthiness is based at least in part on verification using an LBS such as GPS technology in conjunction with a clock mechanism as discussed above with respect to FIG. 5.

Using LBS technology, system 100 can at least partially verify engagement of one or more users toward a particular transaction (Step 624). Users who share a physical item will at some point have to meet up to exchange the physical item. Since the users' locations can be tracked, LBS technology can be utilized to verify how long they were together and in what location(s). Thus, system 100 can, to an extent, verify firsthand that one or more users is carrying out an obligation associated with the transaction, such as showing up at the correct time at a meeting location or dropping off an item at a certain address. However, the use of LBS by system 100 applies not only to identifying firsthand where users are or if they met up as prescribed, but also the length of time users are near each other. It will be appreciated that such information is important when tracking exchanges that involve skills or services. If the service being offered is a plumbing service quoted as two hours from one user to another, then the transaction can in part be verified as having been completed if the location of the user offering the plumbing is at the agreed upon location (e.g., at the home or office of the user who needs the plumber) for two hours and ten minutes. The mobile devices of the two users in the transaction can be tracked to see how long they were within a pre-set distance of one another. By contrast, if the user providing the service is only at the location for fifteen minutes, then system may be configured to flag the transaction as unverified or incomplete. Many other applications of LBS to system 100 may be utilized, such as matching users based on location, or assisting in coordinating users if they are having navigation trouble meeting up.

In preferred embodiments, a user's prior history with LBS tracking may be used as a factor which contributes to the creditworthiness rating assigned to the user. This history may be utilized to provide the system and other users with details about the user's positive and negative history, such as whether the user was ever a "no-show" without providing an alternate meeting time at a later date. By providing evidence of transactions occurring which cannot be falsified or faked by a user, LBS related functionalities further verifies the actions of a user, and thus supplements methods of determining creditworthiness. In essence, without such verification using GPS or other LBS technology, the credibility of these transactions and users may be brought into question by other uses who have never met them. System 100 can continually track the status of each transaction, and store in database 103, all location data and time data 208 received from remote computing devices of the users. In this manner, the transactions history in conjunction with LBS functionality contributes to the full picture of a user.

System 100 is configured to verify that the sharing does in fact take place using GPS or LBS detection technology (Step 624) as discussed above, and then determines whether the sharing was successfully completed (Step 626). If the sharing was completed successfully (e.g., both users confirm after the agreed upon time for which the sharing occurs) (Yes, Step 626), then system 100 may increase the trustworthiness score of the user who made use of the shared subject (Step 628). If, according to the GPS or LBS detection, it appears the sharing was not completed successfully (No, Step 630), then system 100 may decrease the trustworthiness score for the user who failed to make use of the sharing subject (Step 630). System 100 can then update the user information and trustworthiness score of the particular user in database 103 (Step 632). In certain embodiments, successful completion can be predicted not only using the GPS or LBS data, but also from receiving confirmation from one or both users using their mobile devices.

Figure 7:
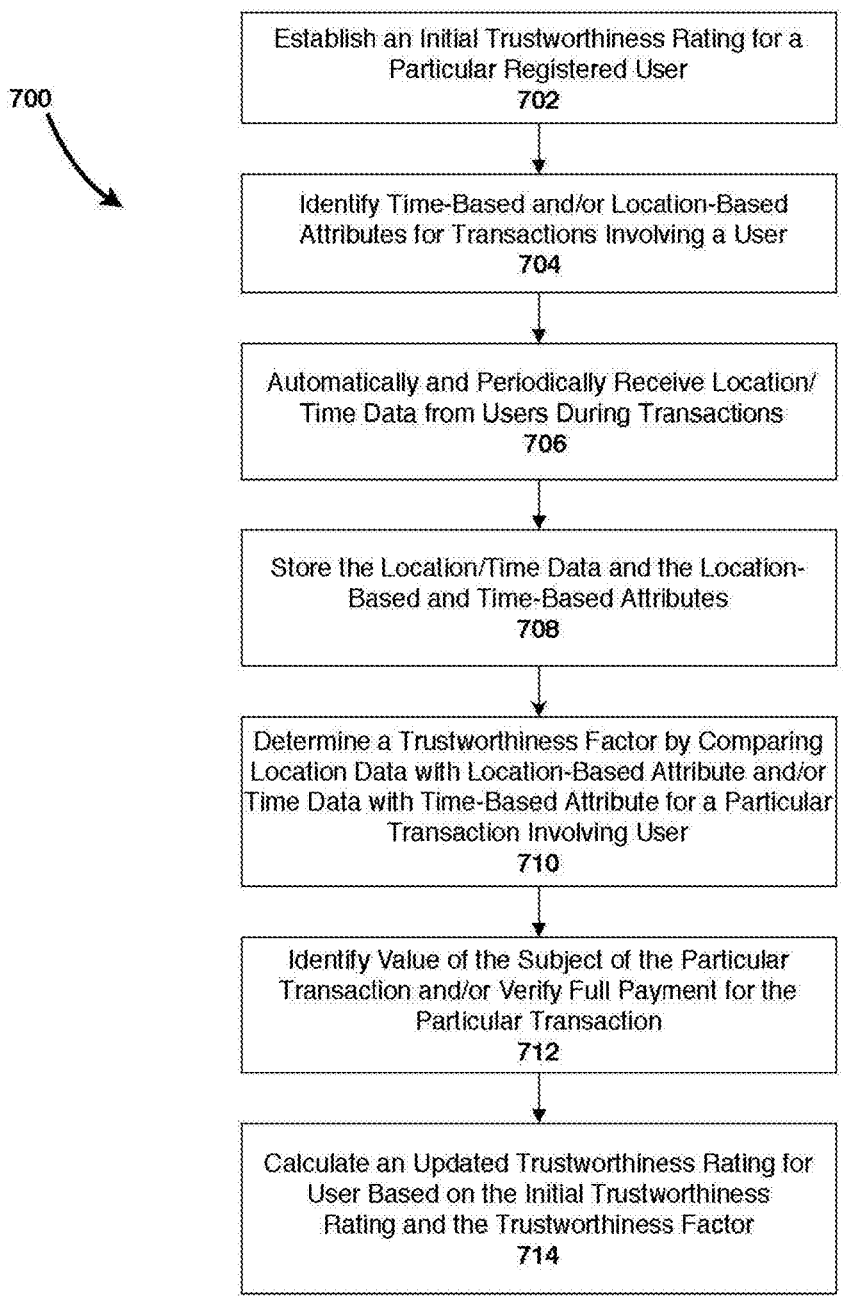
FIG. 7 is a flow diagram of a method for determining an updated trustworthiness rating for at least one user associated with a transaction in accordance with exemplary embodiments of the inventive disclosure.

Referring next to FIG. 7, shown is a flow diagram of a method for determining an updated trustworthiness rating for at least one user associated with a transaction in accordance with exemplary embodiments of the method and system of the inventive disclosure. As shown, system and method 700 preferably comprises, for each user of the system and method, establishing an initial trustworthiness score or rating (Step 702), and then identifying, for each of one or more transactions, a subject (i.e., a good, a service, a space, a skill, etc.) having an agreed upon value and a time-based attribute and/or a location-based attribute (Step 704). The time-based attribute may include one or more of a pick-up location, a drop-off location, an exchange location, a service location, etc., while the time-based attribute may include one or more of a start time, a start date, an end time, an end date, a time period, etc. System 100 may then receive, from a plurality of remote computing devices associated with a plurality of users, location data and/or time data corresponding to a plurality of time-varying geographic locations of the users during performance or completion of the transaction(s) (Step 706). Preferably, the location/time data is received from remote computing devices 104/105/106/110 of the respective users, and each remote computing device 104/105/106/110 preferably comprises or includes a GPS receiver/unit or other location identifier, and may be a mobile phone, a vehicle, a robotic device, an in-vehicle navigation system, etc. The identified attributes and received data may then be stored in a database (Step 708).

This initial trustworthiness rating or score may be represented as a score (e.g., a score from 1 to 10, 1-100, etc.), and may initially be established or determined when a user creates an account. The initial trustworthiness score or rating may be set automatically by the system according to predetermined rules that have been established or may be established based on any of a number of parameters. Alternatively, the system may automatically set the score or rating to zero upon initial registration of a user until it is adjusted based on future sharing transactions of the user. If the system sets the initial trustworthiness score or rating based on any of a number of parameters, the user may be prompted to input certain information (e.g., related to sharing transaction, etc.). System 100 may also identify any historical data or information about the user, if available. For example, if the user previously utilized system 100 for one or more transactions as either a lender or a borrow, or if the user previously created an account but never used it, then the user's information can be retrieved from database 103 according to his/her social security number, name, address, credit card number, etc. System 100 may also use other information relating to the user when establishing the initial trustworthiness rating or score, such as the user's on-line activity, offline activity, information from a third-party on-line system where user has an existing profile, the number of devices the user has linked to the user account in the third-party on-line system, how long a user has had the third-party on-line system user account, the sharing or use history of the user with the third-party on-line system, the amount of time that has passed since information from the corresponding user profile has been updated, the frequency with which the user updates information on his/her user profile, feedback or comments from others having interacted with the user, on-line behavioral information or patterns (e.g., browsing patterns, social networking system interaction patterns, etc.), and others.

System 100 may determine a trustworthiness factor for a particular user of the plurality of users associated with one transaction of the plurality of transactions (Step 710). In determining the trustworthiness factor, system 100 compares, in accordance with predetermined rules, the location data related to the user with the location-based attribute related to the transaction and/or the time data related to the user with the time-based attribute related to the transaction. The comparison of the location data with the location-based attribute preferably determines a location-compliance level, while the comparison of the time data with the time-based attribute preferably determines a time-compliance level. The time-compliance level and/or the location-compliance level are analyzed for compliance with a set of predetermined compliance rules in order to determine a value to assign to the trustworthiness factor. In certain embodiments, the comparison includes utilizing the location data and the time data for the particular transaction to confirm at least one of a start or a completion of the particular transaction. Additionally, the agreed upon value of the subject of the particular transaction and/or a verification of full payment for the particular transaction is determined to further verify the validity or authenticity of the particular transaction (Step 712). Once the trustworthiness factor is determined, system 100 calculates, for the particular user, an updated trustworthiness rating based on the initial trustworthiness rating and the trustworthiness factor (Step 714).

In accordance with certain embodiments, messaging between users regarding proposed and negotiated subjects of value, ratings, locations, terms of transactions, etc., may be secured using a particular public key from the user's pool of public keys and an associated reference value. A recipient's public key may be obtained after mutual consent by the sender and recipient after checking one or more privacy lists. For example, a recipient's particular public key, device ID number, and application ID number may be used in the encryption of a symmetric key used to encrypt data, and in encapsulation of a message. In certain embodiments, a sender may enter one or more particular recipient names into a region within an interface of forum module 320 via mobile device 110. System 100 may be configured to generate a random symmetric encryption key such as, for example, an AES 256 bit key. The symmetric encryption key may be used to encrypt the message body, any attachments, and any message control options. In certain embodiments, the sender's own information may be included. Additionally, the symmetric key may itself be encrypted with the particular public key of each recipient (obtained from the pool of public keys). In accordance with certain embodiments, system 100 may be configured to generate a public key and a private key for each of a plurality of users. A particular user may then encrypt message or attachment content using a plurality of public keys of the plurality of users. The particular user may then create a secure social feed containing the encrypted content, which includes data enabling the plurality of users to gain access to view the content by decrypting the content with the private key. The particular user may then publish the encrypted content in a forum (e.g., via forum module 320). Other means of encryption may be used in conjunction with the systems and methods described herein, such as, for example, the systems and methods described in U.S. Pat. No. 9,654,288 to Howell, et al., filed Dec. 10, 2015, issued May 16, 2017, and titled Securing Group Communications, which is hereby incorporated by reference herein in its entirety.

In certain embodiments, trustworthiness verification of users of system 100 is performed by verification module 300. The trustworthiness may be represented as a score (e.g., a score from 1 to 10), and can initially be determined when a user creates a user account. As the trustworthiness score of a user may change over time-based on various factors, it may be determined every predetermined about of time (e.g., every week, every month, etc.). Alternatively, the trustworthiness score can be determined every time it is needed and/or each time a user performs or is involved in a new transaction. A user's trustworthiness score may also be based on verification through GPS or LBS detection (discussed above with respect to FIG. 5), and at least one additional factor, such as, for example, a user's sharing history, on-line activity, offline activity, etc. The on-line activity trustworthiness score can be based on the date a third-party on-line system user profile is created, the date a third-party on-line system user profile is updated, and/or the activity of the user on the third-party on-line system.

In other embodiments, other criteria, such as the number of devices the user has linked to the user account in the third-party on-line system may also be used to determine the trustworthiness score. In yet other embodiments, the trustworthiness score may depend on how long a user has had a third-party on-line system user account, the sharing history of the user, the amount of time that has passed since information from the corresponding user profile has been updated, or the frequency with which the user updates information on his/her user profile. By way of example, a recent change in name or date of birth may result in a lowering of a user's trustworthiness score since these would both generally be fixed unless a mistake was made initially or an individual took on a new married name. Numerous types of functions, such as linear, non-linear, quadratic, exponential, power, rational, logarithmic, and the like may be used to determine a trustworthiness score for a plurality of transactions.

The trustworthiness score may also be inferred from a user's activity and determined based on the inferred pattern. For example, the browsing behavior of a user can be analyzed, and a score can be given based on the browsing behavior. For example, if a male user only interacts with female users in a social networking system, or if a male user only asks questions about accommodations offered by female hosts in an accommodation reservation system, such browsing behavior might result in a low trustworthiness score. In certain embodiments, an algorithm may be used to predict the trustworthiness of a user based on his/her on-line activities. The trustworthiness score determination may be based on all on-line available information for a user. The algorithm may be focused on available information from every user of the on-line system. In other embodiments, the algorithm may be focused on available information for users who have received comments from other users of the on-line system. In yet other embodiments, the algorithm may be focused on available information for users that have been using the on-line system for at least a threshold amount of time. For example, in an accommodation reservation system, a host may provide a feedback trustworthiness score (e.g., from 0 stars to 5 stars) for users that stay at their accommodation based on the host's observations. Similarly, in a rideshare system, a driver may provide a feedback trustworthiness score for users that carpooled with the driver. On-line behavioral information which may be available from the user (e.g., browsing patterns, social networking system interaction patterns, etc.) can then be entered together with the trustworthiness factors based on feedback into the machine learner as training sets.

Comments from other users may be utilized to determine the trustworthiness score. For example, if a user always receives positive comments or ratings from hosts after staying at shared accommodations offered by those hosts, then the trustworthiness score may be increased by trustworthiness verification module 306. For instance, a sentiment analysis or opinion mining may be performed on text from comments written by other users. Additionally, a quantitative analysis may be performed on numerical responses (e.g., scores given by other users). The sentiment analysis and/or quantitative analysis from different users can be aggregated and/or weighted based on recency of the responses. Recent comments may be weighed higher than older comments. In certain embodiments, comments may also be weighed using other factors such as the trustworthiness of the user leaving the comment.

In certain embodiments, if a specific user has multiple accounts in different systems, each user account may be assigned its own trustworthiness score based on information available in each of the user profiles. The scores may be aggregated to obtain an overall trustworthiness score. For instance, if a user has a social networking system user account, a professional networking system account, and a blog account, a different score may be determined for each of the accounts the user owns (e.g., the social networking system account might get a first trustworthiness score, the professional networking system account might get a second trustworthiness score, and the blog account might get a third trustworthiness score). The user's overall trustworthiness score may be an aggregate of these scores or may be represented as an average of these scores. Alternatively, the user's trustworthiness score may be the highest one of these individual scores.

In one embodiment, a user's connections in a social networking system may also influence the user's trustworthiness score. As used herein, a user's connection is another user in a social networking system that has established a relationship, prior contact, or has prior transactions with the user in the social networking system (e.g., a friendship relationship). A connection may be established at different levels. For example, in a first level connection, the two users may have a direct relationship with one another. In a second level connection, the two users do not have a direct connection with each other, but both users have established a direct relationship with a third user (e.g., mutual friend).

By way of example, a trustworthiness score for each other user can be determined, weighted, and aggregated to the current user's trustworthiness score. In one embodiment, only first level connections are considered for a user's trustworthiness score. In other embodiments second level connections may also be considered for a user's trustworthiness score. In yet other embodiments, the trustworthiness scores of a users' connections are weighted according to the level of their connections with other users (e.g., first level connections may correspond to one weight, and second level connections may correspond to a different weight, lower than the weight of the first level connections). The trustworthiness scores of a user's connections can be weighed according to the connection's affinity with the user. Connections with higher affinity may be assigned a higher weight than connections with a lower affinity.

The trustworthiness score may additionally or alternatively be based on factors relating to information available in various databases, such as a sex offender database, a criminal records database, etc. In certain embodiments, the trustworthiness score can be based on the time which the information has been in database 103. For example, trustworthiness verification module 306 may only take into consideration entries that are at most a predetermined amount of time old (e.g., entries that are less than 5 years old). Alternatively, trustworthiness verification module 306 may weigh the scores of each entry based on how long the entries have been stored in database 103.

Figure 8:
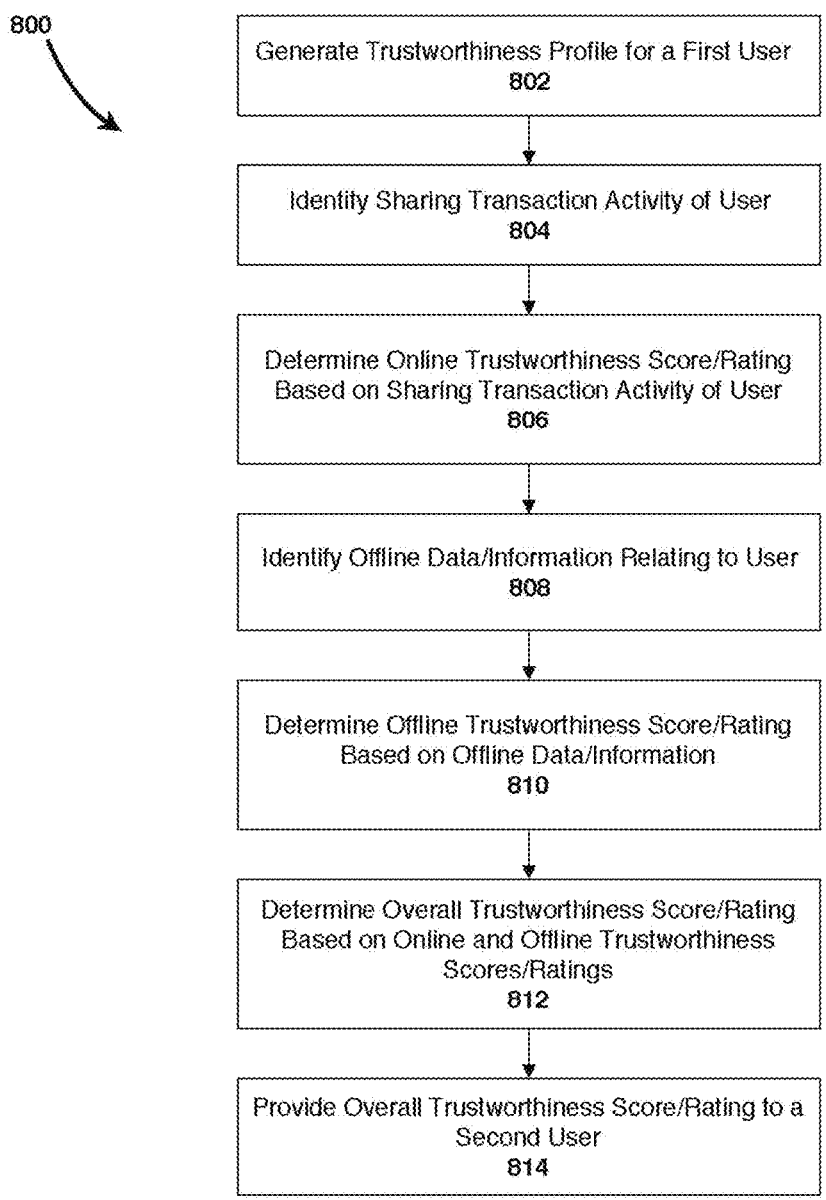
FIG. 8 is a flow diagram of an exemplary method for determining a trustworthiness score or rating for a user associated with a transaction based on on-line and offline information in accordance with exemplary embodiments of the inventive disclosure.

Turning to FIG. 8, shown is a flow diagram of an exemplary method for determining a trustworthiness score or rating for a user based on on-line and/or offline information. FIG. 8 shows a more detailed method 800 consistent with FIG. 1's embodiment. In FIG. 8's example, the method 800 starts at Step 802 wherein, upon receiving a request from a first entity to generate an entity trust profile, the trust profiler generates a trustworthiness profile for the first user. The online trustworthiness verification module receives information about a user's online identity from a third-party online system and identifies (Step 804) the activity (e.g., the sharing transaction history) of the user in the third-party online system. Based on the received information and the identified online activity, an online trustworthiness score is computed (Step 806). The offline trustworthiness verification module identifies and receives offline information about the user (Step 808) and determines an offline trustworthiness score based on the received offline information (Step 810). In some embodiments, the online trustworthiness score and the offline trustworthiness score may be aggregated to generate an overall trustworthiness score (Step 812). Finally, the overall trustworthiness score of the first user is provided to a second user (Step 814), so that the second user can evaluate the trustworthiness of the first user based on the overall trustworthiness score. It will be appreciated that as the first user continues to interact with the various online sources (and/or adds new online sources), the overall trustworthiness score of the first user can be updated dynamically. In this manner, the overall trustworthiness score reflects the continued and possibly up-to-the-minute trustworthiness of the first user based on how the first user is behaving with respect to a number of different online sources.

In certain embodiments, each type of entry may be assigned a score that may then be aggregated in conjunction with location tracking as described herein to obtain an overall trustworthiness score. If a user has been convicted of a felony, each type of felony (e.g., murder, rape, manslaughter, treason, kidnapping, etc.) may be assigned a different score. If an entry is found for a user, then the entry may negatively impact the trustworthiness score of the user. In certain embodiments, an algorithm may be used to determine the trustworthiness of users with entries in the different databases. For example, a model may be generated based on past experiences with users having entries in different databases. For instance, after a user stayed at an accommodation offered by a host, the host may indicate whether the user is trustworthy, this information along with the information found in the different databases may be entered into an algorithm to generate a model having the types of entries of the different databases as input and a determination whether the user is trustworthy or not as the output. If no entries are found, then an offline trustworthiness score may assign a positive score to the user. Alternatively, if no entries are found, then the offline trustworthiness score may be assigned a neutral score. The individual offline trustworthiness scores from each database used may be aggregated in the same way the individual on-line trustworthiness scores are aggregated. The weights assigned may depend on the type of entry on which the individual trustworthiness score is based and/or the time stamp of the entry on which the individual trustworthiness score is based. Certain entries in the information available about the user may cause system 100 to send the user an automatic trustworthiness rejection. For example, if the user is a known sex offender or has a felony in his/her criminal records, this may cause the user to get an automatic trustworthiness rejection.

Other information such as education history may also be used to determine an offline trustworthiness score. For instance, each degree may positively influence the offline trustworthiness score of a user. A doctorate degree may be assigned a higher positive score than a master's degree, which may receive a higher score than a bachelor's degree, and so on. These scores may be also aggregated with the other trustworthiness scores to determine the user's overall offline trustworthiness score. The trustworthiness verification module 306 may be configured to receive information about a user's on-line identity from a third-party on-line system and identify the activity of the user in the third-party on-line system. Based on the received information and the identified on-line activity, an on-line trustworthiness score can be computed.

In certain embodiments, the particular user may be a lending user, and the particular transaction may be a sharing transaction involving the subject having the agreed upon value, where the subject is shared by the lending user to a borrowing user. Based on verifying one or more of the plurality of transactions, system 100 may determine an estimated cash flow of the lending user based on an average value of a sub-set of the plurality of transactions with which the first lending user is associated, and/or a frequency of occurrence of the transactions. Additionally, and alternatively, system 100 may further receive a request from the lending user (i.e., the user whose trustworthiness score or rating was just updated) to borrow money from another lending user. In response to the request to borrow money, system 100 may display to the other lending user (e.g., by one or more indicators as discussed above) either the updated trustworthiness rating of the lending user (now the borrowing user) or the estimated cash flow of the lending user (now the borrowing user).

In certain other embodiments for calculating the trustworthiness rating, system 100 may further identify a social networking platform with which the particular user is associated in order to determine a reputation score for the particular user associated with the social networking platform. The reputation score or rating may be based on one or more associations with other system users to whom the particular user is connected or otherwise associated with via the social networking platform. Utilizing the reputation score or rating, system 100 may further update the trustworthiness rating of the particular user. Examples of such social networking platforms which may be used in conjunction with systems and methods disclosed herein to enhance confidence in the trustworthiness of other users based on the other users' friends, classmates, etc. through the social network may be found in, for example, U.S. Pat. No. 10,003,922, which was filed on Feb. 14, 2017, which issued on Jun. 19, 2018, and which is hereby incorporated by reference herein in its entirety. System 100 may further receive financial data from a particular user and confirm the financial data through an asset verification module. In response to confirming the validity or authenticity of the financial data, system 100 may store the financial data in the database and assign a trustworthiness factor or otherwise update the trustworthiness rating for the particular user based on the financial data. System 100 may also identify, based on the location-based attribute and/or the time-based attribute, whether a particular remote computing device of the particular user is within a predetermined acceptable distance of a location designated by the location-based attribute at a time that is determined to be between a designated start time and a designated end time of the particular transaction, for an entire time period between the designated start time and the designated end time, and/or at least a preset amount of time-based on the time-based attribute of the transaction. The trustworthiness factor is alternatively determined based on this identifying.

Alternatively, system 100 receives a confirmation of completion of the particular transaction from a user associated with the particular transaction. In response to the updated trustworthiness rating of the particular user exceeding a predetermined threshold, and/or the particular user completing a predetermined number of sharing transactions, system 100 may transmit a notification associated with the particular user to an additional remote computing device associated with an additional user in accordance with pre-set preferences of the users. System 100 may also, in accordance with one or more pre-determined rules of the particular transaction, confirm transmission of a monetary subject of value from the lending user to the borrowing user, repayment of the monetary subject of value from the borrowing user to the lending user. A trustworthiness factor may be generated based on an adherence level of the borrowing user to pre-determined rules regarding repayment of the monetary subject of value. Based on the updated trustworthiness rating and the trustworthiness factor for the particular transaction, system 100 may calculate a modified trustworthiness rating for the borrowing user.

System 100, in order to verify the identity of a user, may also receive identification data about the user including, for example, a first name, a last name, etc. A request may then be transmitted to an on-line platform to retrieve additional identification data about the user from another source including a first name, a last name, etc., in order to compare the identification information and determine a difference between the identification data. Such comparison may be performed to confirm an identity of the user, and in response to the difference not exceeding a predetermined threshold, generate a user profile for the user, which may be stored in the user profile. System 100, in determining a trustworthiness factor, may further conduct a criminal history search for the user based on the identification data. In response to the criminal history search reflecting a number of criminal convictions exceeding a predetermined threshold and/or reflecting a predetermined number of criminal convictions of a certain type, system 100 may preclude the user from receiving a trustworthiness score or rating or from participating in any transactions.

Remote or mobile computing devices 104/105/106/110 may optionally comprise or otherwise include a user engagement panel configured for the plurality of users to exchange information regarding sharing subjects of value. Still further, system 100 may include a ratings module for enabling the plurality of users to rate or review one another based on completed transactions. System 100 may also provide an on-line platform for establishing connections between two or more of the users and a search module configured to query the database to verify connections or prior transactions between the two or more of the users. System 100 may further include a transaction module for receiving a proposal for sharing a monetary or non-monetary subject of value from the particular user. Along with the updated trustworthiness rating corresponding to the particular user, the transaction module may post the proposal to an on-line forum or platform, which may be accessible in the forum or platform by a borrowing user. Additionally, an updated trustworthiness rating of the borrowing user may be made available or is otherwise accessible by the lending user. System 100 may then generate a particular transaction for the monetary or non-monetary subject of value between the lending user and the borrowing user.

In certain embodiments, system 100 can be configured to enable sharing of one or more subjects of value or financial resources by one user with another user who chooses to pay a fee for money back insurance based at least in part on a current value of one or more subjects associated with the particular transaction. System 100 can be configured to guarantee repayment of at least one of the loans or a third-party commitment through a loan insurance platform. The insurance platform may be configured to collect insurance fees as a prerequisite for sharing financial resources associated with the particular transaction. In other words, a third-party may serve as a guarantor for a lender or sharer and agree to cover the lender's losses if an unethical user steals the lender's goods or does not pay the lender. In return, the third-party guarantor may be entitled to a percentage of the value amount of the subject of the transaction if the user completes the transaction and/or is a regular user. System 100 thus enables one or more borrowing users to secure loan insurance with one or more guarantees from one or more connected users who can condition the loan based on their preferences.

Loan insurance can function as a guarantee for a user. A user lending money for a subject of value may want assurance that he/she will get the loaned item or money back. Such loan insurance can be provided by one or more other users and may be provided from a single individual guarantor or a pool of guarantors. In certain embodiments, loan insurance may be purchased at the discretion of a user and may be based in part on a user's creditworthiness score. A bona fide user who defaults or receives a bad rating from a lender may have his/her trustworthiness score or rating lowered. It will be appreciated that not all users will be eligible for a loan or a money-back guarantee due to a certain credit rating or trustworthiness rating, a threshold which can be preset in system 100. In other embodiments, system 100 may allow a user to be eligible for financial sharing, but only for a certain interest rate. The assessment of creditworthiness may be based on many factors, which can affect the amount and interest rate of the loan, and the number of lenders who want to provide it.

It will be appreciated that the systems and methods disclosed herein offer a platform for a circular economy where excess resources available in one location can be redistributed and reused in another location that lacks the very same resources. On a large scale, such sharing allows for significant savings of materials, energy, and labor that would otherwise be disposed of in a traditional make-use-dispose economy. Tracking and storing the chain of sharing between users builds trustworthiness and can be used to show that a user is authentic. Facilitation of connections and transactions through a user networking system as described herein where the system keeps track of connections between users allows the system 100 to let a user know whether the other user with whom they are currently dealing has a direct or indirect connection to him/her.

The concepts disclosed herein may be applied for users who are not private individuals, such as for-profit or not-for-profit corporations, government agencies, institutions, and/or other entities. Exemplary embodiments offer a space for a variety of different users to offer their skills, services, goods, spaces, and transportation to a large number of potential users in exchange for a commitment to provide the same to a third-party, wherein providers may be classified based on the type of skills, services, goods, spaces, and transportation that they provide. The connections between the providers and those who accept or receive the subjects may be classified based on the exchange that occurs. The platform may classify the users depending on whether they are government agencies, corporations or private individuals along with detailed description of their skills, services, goods, spaces, and transportation. There may be a product/service catalog organized by key subject categories e.g. goods, services, food, etc. The users may be able to provide feedback and ratings after each transaction and company's "creditworthiness" profile may be built up based on these ratings. This feature may be used as a tool to eliminate some risks and costs of "bad business" when parties, either private people or corporate and government entities, are engaging in business transactions with each other for the first time and are not quite sure how reliable the counterpart is. Besides this, the system may offer geographic reference files and maps, latest data on monthly, quarterly or yearly domestic and international transactions, comprehensive data collected from the U.S. and foreign governments with regard to excess or scarce resources.

In certain embodiments, the customer (e.g., the user seeking a subject of value to be shared) may initiate and submit an offer of invitation to a control center via an automated platform accessible via a smartphone or website. The provider of the shared subject, based on various factors such as the price, distance/location (through Location-Based Service integrating GPS technology), time, cost, convenience etc., can review and decide to make an offer that may contain different terms, or choose to not to respond. Customers and providers may negotiate terms of the transaction through the platform via, for example, live-chat, messaging, and any other form of communication. The customer can either accept the offer from the provider, thus constituting a legally binding contract between the two parties, or make a counteroffer for the provider to consider. The provider may accept the counter offer from the customer, thus creating a legally binding contract, or make a counteroffer back to the customer.

The system 100 may be configured to enable providers to search for relevant information and send potentially binding offers to a customer. The customer may accept or make a counteroffer. Both parties may negotiate one or more rounds to form a legal binding contract to complete a transaction which should comply with relevant rules. If there no offer or counteroffer is proffered within a predetermined timeframe, then there is no deal, and either party may look for a new deal. The relevant rules are a predefined set of rules for regulating a transaction but can be changed by stipulation of the user(s) in certain circumstances.

In accordance with certain embodiments, when users transact using the relevant feature, the users may be connected through a business connection. For example, if user A needs a conference room the next day and is willing to pay $20/day for use of a conference room in Flushing, N.Y., then user A can post the offer for the rental of a conference room for a day for $20 in Flushing. Another user, user B, who has an office in downtown Flushing with an open conference room the next day, may respond to user A's posting and provide details about the conference room and a counteroffer of $50 for the day. Both users may see that user A and user B are connected through a regular connection through other users, such as user C, user D, and user E, with whom they have transacted in the past. Because of this prior connection, user A may deem it worthwhile to negotiate, and may send user B a counteroffer for $40/day. User B can accept and complete the transaction, deny, or offer a different price.

Users may also indicate their estimated perceived value of skills, services, goods, spaces, and transportation. Even though the receiver of skills, services, goods, spaces, and transportation doesn't have to pay the provider, knowing how much the skills, services, goods, spaces, and transportation are worth may help to establish fair sharing practices and prevent abuse of the system by some indecent users. For example, if one user provides legal services and estimates that the services are worth $100, while another user shares study books and estimates that the value of the books is $70, then if these two users would engage in a transaction with one another, the user who provides legal services would get a credit of $30, the difference in value between the legal services provided and the value of the books. Such credit could be used for further transactions. In certain embodiments, such a "perceived value" method may be used by on-line retailers to track and analyze customer behavior based on customers' perceived value of skills, services, goods, spaces, and transportation. By analyzing such perceived value, on-line retailers could adjust the threshold price of their products to individual prospective buyers' willingness to pay.

In addition to the integration of a GPS capability, the method and system may integrate an electronic map API, e.g. Google Maps™, on the mobile application on smartphone/Web-based/storage media that would allow users to locate other users within a certain distance of their current location or may allow users to search within the area for sharing subjects. Users as well as service providers would be able to register in different service/industry categories as well as different communities. The system can utilize a digital map and geolocation to match parties. For example, a company or a user that provides computer repair services may be matched with interested parties within his geographic location. That feature would allow the users to make sure that the other parties who advertise certain services and skills do indeed possess the advertised services and skills. Providers and users would be able to update the availability of skills, services, goods, spaces, and transportation in real time, provide information about the time when services could be provided, location and time when goods could be picked up, photos of the available inventory, etc. For security purposes of the users to not disclose exact locations, the system would provide a feature where geolocations of the parties would be coded in a way that no actual address would need to be provided unless permitted to be disclosed by users.

The platform of the application may also offer features for users to share ideas such as a forum, post comments, ask questions and post suggestions in regards to transactions. The GPS location function may be integrated with the forum function so the location of users may be used to assess whether the free sharing is possible. The forum feature may have two sections-one for users who possess first-hand knowledge of the free shared subject. First-hand knowledge is assessed by the geo-location of the user. If the user has passed by or been in a location previously, the user may be allowed to contribute to this section of the forum. Such tracking allows for more accurate and verifiable information contributed. In other embodiments, the system may allow all users to contribute unverified information. This allows for the free dissemination of information between users which is not hindered by the mobile application. Users can navigate through several different sections within the forum.

The described embodiments of the invention are intended to be exemplary and numerous variations and modifications will be apparent to those skilled in the art. All such variations and modifications are intended to be within the scope of the inventive disclosure as defined in the appended claims. Although the inventive disclosure has been described and illustrated in detail, it is to be clearly understood that the same is by way of illustration and example only and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may, also be provided separately or in, any suitable combination. It is appreciated that the particular embodiment, described in the specification is intended only to provide an extremely detailed disclosure of the inventive disclosure and is not intended to be limiting.

Modifications of the above disclosed apparatus and methods which fall within the scope of the invention will be readily apparent to those of ordinary skill in the art. Accordingly, while the inventive disclosure has been disclosed in connection with exemplary embodiments thereof, it should be understood that other embodiments may fall within the spirit and scope of the invention, as defined by the following claims.

It will be understood that the phrases or terminology employed herein is for purposes of description and not limitation. While the inventive disclosure has been shown and described with reference to various preferred embodiments, those skilled in the art will readily appreciate that various changes and/or modifications may be made without departing from the spirit and scope of the inventive disclosure as defined by the claims. Any exemplary embodiments described herein are merely illustrative, and many variations can be introduced without departing from the spirit of the disclosure or from the scope of the appended claims. For example, elements and/or features of different exemplary embodiments may be combined with each other and/or substituted for each other. The scope of the inventive disclosure, therefore, shall be defined solely by the following claims, and it will be apparent to those of skill in the art that numerous changes may be made in such details without departing from the spirit and the principles of the inventive disclosure.

What is claimed is:

1. A computer-implemented method, comprising:
    receiving, by a server, from a plurality of remote computing devices associated with a plurality of users, location data and time data corresponding to a plurality of time-varying geographic locations of the plurality of users during a plurality of transactions between the plurality of users, wherein each of the transactions includes a subject having an agreed upon value and at least one of a time-based attribute or a location-based attribute;
    storing, by the server, the location data, the time data, and the at least one time-based attribute or location-based attribute in a database;
    determining, by the server, a trustworthiness factor for a particular user of the plurality of users associated with a particular transaction of the plurality of transactions, wherein the particular user has an initial trustworthiness rating, and wherein the trustworthiness factor is based on:
        (i) comparing, in accordance with a set of predetermined rules, at least one of: (a) the respective location data with the respective location-based attribute to determine a level of location compliance, or (b) the respective time data with the respective time-based attribute to determine a level of time compliance, wherein the location-based attribute includes at least one of a pick-up location, a drop-off location, an exchange location, or a service location, and wherein the time-based attribute includes at least one of a start time, a start date, an end time, an end date, or a time period; and
        (ii) at least one of the agreed upon value of the respective subject of the particular transaction or a verification of full payment for the particular transaction;
    calculating, by the server, for the particular user, an updated trustworthiness rating based on the initial trustworthiness rating and the trustworthiness factor;
    generating, by the server, a public key and a private key for each of the plurality of users;
    encrypting, by the server, a content associated with the particular user using a plurality of public keys of the plurality of users;
    creating, by the server, a secure social feed containing the encrypted content, the encrypted content including data enabling the plurality of users to gain access to view the encrypted content by decrypting the encrypted content with a respective private key;

publishing, by the server, the encrypted content in a forum accessible by one or more of the plurality of users; and displaying, by the server, at least a portion of information related to the updated trustworthiness rating associated with the particular user.

2. The method according to claim 1, further comprising:
receiving, by the server, from an additional user of the plurality of users, one or more preset values or one or more preset ranges for a desired trustworthiness rating of one or more of the plurality of users, wherein the portion of information includes one or more indicators displayed in one or more formats based on the trustworthiness rating of the particular user relative to the one or more preset values or the one or more preset ranges.

3. The method according to claim 2, further comprising:
automatically transmitting, by the server, one or more notifications to the additional user when the updated trustworthiness rating reaches a value which corresponds to the one or more preset values or is within the one or more preset ranges, wherein the one or more notifications include the one or more indicators corresponding to the updated trustworthiness rating of the particular user.

4. The method according to claim 1, wherein the particular user is a first lending user, and wherein the particular transaction is a sharing transaction in which the subject of the particular transaction is shared by the first lending user to a borrowing user of the plurality of users.

5. The method according to claim 4, further comprising:
determining, by the server, an estimated cash flow of the first lending user based on:
(a) an average value of a plurality of completed transactions of the first lending user; and
(b) an average length of time between subsequent transactions of the first lending user during a total time period over which the plurality of completed transactions were completed;
updating, for the first lending user, the updated trustworthiness rating based on the estimated cash flow; and
displaying, to a second lending user of the plurality of users, at least one of the updated trustworthiness rating of the first lending user or the estimated cash flow of the first lending user.

6. The method according to claim 1, wherein each of the plurality of remote computing devices associated with the plurality of users comprises at least one of a global positioning system (GPS) receiver or an in-vehicle navigation system.

7. The method according to claim 1, wherein the comparing in step (i) includes utilizing the respective location data and the respective time data for the particular transaction to confirm at least one of a start or a completion of the particular transaction.

8. The method according to claim 1, further comprising:
identifying, by the server a social networking platform with which the particular user is associated;
determining, by the server, a reputation score for the particular user associated with the social networking platform based on one or more associations with other users to whom the particular user is connected via the social networking platform; and
updating, by the server, the trustworthiness rating of the particular user based on the reputation score.

9. The method according to claim 1, further comprising:
identifying, by the server, based on at least one of the location-based attribute or the time-based attribute, whether a particular remote computing device of the particular user is within a predetermined acceptable distance of the location-based attribute:
(a) between a designated start time and a designated end time of the particular transaction;
(b) for an entire time period between the designated start time and the designated end time; or
(c) at least a preset amount of timebased on the time-based attribute of the transaction,
wherein the particular user provides a service associated with the particular transaction, and the trustworthiness factor is additionally determined based on the identifying in steps (a), (b), or (c); and
receiving, by the server, a confirmation of completion of the particular transaction from at least one user associated with the particular transaction.

10. The method according to claim 1, further comprising:
receiving, by the server, from the particular user, a proposal for sharing a non-monetary subject of value, wherein the particular user is a lending user;
posting the proposal, along with the updated trustworthiness rating corresponding to the lending user, to an on-line forum, wherein the posting is accessible in the on-line forum by a borrowing user, and wherein an updated trustworthiness rating of the borrowing user is accessible in the forum by the lending user; and
generating the particular transaction for the non-monetary subject of value between the lending user and the borrowing user.

11. A system for verifying transaction trustworthiness, comprising:
a server communicatively coupled to a plurality of remote computing devices associated with a plurality of users via a network, wherein the server includes at least one non-transitory computer-readable storage medium with computer-readable instructions stored therein, a database, and a processor instructed to execute the computer-readable instructions to:
receive, from the plurality of computing devices, location data and time data corresponding to a plurality of time-varying geographic locations of the plurality of users during a plurality of transactions between the plurality of users, wherein each of the transactions includes a subject having an agreed upon value and at least one of a time-based attribute or a location-based attribute;
store the location data, the time data, and the at least one time-based attribute or location-based attribute in the database;
determine a trustworthiness factor for a particular user of the plurality of users associated with a particular transaction of the plurality of transactions, wherein the particular user has an initial trustworthiness rating, and wherein the trustworthiness factor is based on:
(i) comparing, in accordance with a set of predetermined rules, at least one of: (a) the respective location data with the respective location-based attribute to determine a level of location compliance, or (b) the respective time data with the respective time-based attribute to determine a level of time compliance, wherein the location-based attribute includes at least one of a pick-up location, a drop-off location, an exchange location, or a service location, and wherein the time-based attribute includes at least one of a start time, a start date, an end time, an end date, or a time period; and (ii) at least one of the agreed upon value of the respective subject of the particular transaction or a verification of full payment for the particular transaction;

calculate, for the particular user, an updated trustworthiness rating based on the initial trustworthiness rating and the trustworthiness factor;

generate a public key and a private key for each of the plurality of users;

encrypt a content associated with the particular user using a plurality of public keys of the plurality of users;

create a secure social feed containing the encrypted content, the encrypted content including data enabling the plurality of users to gain access to view the encrypted content by decrypting the encrypted content with a respective private key;

publish the encrypted content in a forum accessible by one or more of the plurality of users; and display at least a portion of information related to the updated trustworthiness rating associated with the particular user.

12. The system according to claim 11, wherein the processor is further instructed to:
receive, from an additional user of the plurality of users, one or more preset values or one or more preset ranges for a desired trustworthiness rating of one or more of the plurality of users, wherein the portion of information includes one or more indicators displayed in one or more formats based on the trustworthiness rating of the particular user relative to the one or more preset values or the one or more preset ranges.

13. The system according to claim 12, wherein the processor is further instructed to:
automatically transmit one or more notifications to the additional user when the updated trustworthiness rating reaches a value which corresponds to the one or more preset values or is within the one or more preset ranges, wherein the one or more notifications include the one or more indicators corresponding to the updated trustworthiness rating of the particular user.

14. The system according to claim 11, wherein the particular user is a first lending user, and wherein the particular transaction is a sharing transaction in which the subject of the particular transaction is shared by the first lending user to a borrowing user of the plurality of users.

15. The system according to claim 14, wherein the processor is further instructed to:
determine an estimated cash flow of the first lending user based on:
(a) an average value of a plurality of completed transactions of the first lending user; and
(b) an average length of time between subsequent transactions of the first lending user during a total time period over which the plurality of completed transactions were completed;
update, for the first lending user, the updated trustworthiness rating based on the estimated cash flow; and
display, to a second lending user, at least one of the updated trustworthiness rating of the first lending user or the estimated cash flow of the first lending user.

16. The system according to claim 11, wherein each of the plurality of remote computing devices associated with the plurality of users comprises at least one of a global positioning system (GPS) receiver or an in-vehicle navigation system.

17. The system according to claim 11, wherein the comparing in step (i) includes utilizing the respective location data and the respective time data for the particular transaction to confirm at least one of a start or a completion of the particular transaction.

18. The system according to claim 11, wherein the processor is further instructed to:
identify a social networking platform with which the particular user is associated;
determine a reputation score for the particular user associated with the social networking platform based on one or more associations with other users to whom the particular user is connected via the social networking platform; and
update the trustworthiness rating of the particular user based on the reputation score.

19. The system according to claim 11, wherein the processor is further instructed to:
identify, based on at least one of the location-based attribute or the time-based attribute, whether a particular remote computing device of the particular user is within a predetermined acceptable di stance of the location-based attribute:
(a) between a designated start time and a designated end time of the particular transaction;
(b) for an entire time period between the designated start time and the designated end time; or
(c) at least a preset amount of time based on the time-based attribute of the transaction,
wherein the particular user provides a service associated with the particular transaction, and the trustworthiness factor is additionally determined based on the identifying in steps (a), (b), or (c); and
receive a confirmation of completion of the particular transaction from at least one user associated with the particular transaction.

20. The system according to claim 11, wherein the processor is further instructed to:
receive, from the particular user, a proposal for sharing a non-monetary subject of value, wherein the particular user is a lending user;
post the proposal, along with the updated trustworthiness rating corresponding to the lending user, to an on-line forum, wherein the posting is accessible in the on-line forum by a borrowing user, and wherein an updated trustworthiness rating of the borrowing user is accessible in the forum by the lending user; and
generate the particular transaction for the non-monetary subject of value between the lending user and the borrowing user.

* * * * *